United States Patent
Lebaredian et al.

(10) Patent No.: US 11,227,448 B2
(45) Date of Patent: Jan. 18, 2022

(54) CLOUD-CENTRIC PLATFORM FOR COLLABORATION AND CONNECTIVITY ON 3D VIRTUAL ENVIRONMENTS

(71) Applicant: NVIDIA Corporation, Santa Clara, CA (US)

(72) Inventors: Rev Lebaredian, Los Gatos, CA (US); Michael Kass, San Jose, CA (US); Brian Harris, Santa Clara, CA (US); Andrey Shulzhenko, Santa Clara, CA (US); Dmitry Duka, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 16/826,269

(22) Filed: Mar. 22, 2020

(65) Prior Publication Data
US 2021/0049827 A1    Feb. 18, 2021

Related U.S. Application Data

(63) Continuation-in-part of application No. 16/538,594, filed on Aug. 12, 2019.
(Continued)

(51) Int. Cl.
*G06T 19/20* (2011.01)

(52) U.S. Cl.
CPC ........ *G06T 19/20* (2013.01); *G06T 2219/024* (2013.01)

(58) Field of Classification Search
CPC combination set(s) only.
See application file for complete search history.

(56) References Cited

U.S. PATENT DOCUMENTS

| 5,978,582 A * | 11/1999 | McDonald | G06F 9/4488 717/104 |
| 6,154,215 A * | 11/2000 | Hopcroft | G06T 11/206 345/418 |

(Continued)

OTHER PUBLICATIONS

Ellis, C. A., & Gibbs, S. J. (Jun. 1989). Concurrency control in groupware systems. In Proceedings of the 1989 ACM SIGMOD international conference on Management of data (pp. 399-407).
(Continued)

*Primary Examiner* — Motilewa Good Johnson
(74) *Attorney, Agent, or Firm* — Shook, Hardy & Bacon L.L.P.

(57) ABSTRACT

A content management system may maintain a scene description that represents a 3D virtual environment and a publish/subscribe model in which clients subscribe to content items that correspond to respective portions of the shared scene description. When changes are made to content, the changes may be served to subscribing clients. Rather than transferring entire descriptions of assets to propagate changes, differences between versions of content may be exchanged, which may be used construct updated versions of the content. Portions of scene description may reference other content items and clients may determine whether to request and load these content items for lazy loading. Content items may be identified by Uniform Resource Identifiers (URIs) used to reference the content items. The content management system may maintain states for client connections including for authentication, for the set of subscriptions in the publish/subscribe model, and for their corresponding version identifiers.

20 Claims, 15 Drawing Sheets

Related U.S. Application Data

(60) Provisional application No. 62/707,730, filed on Nov. 14, 2017.

(56) References Cited

U.S. PATENT DOCUMENTS

| | | | | |
|---|---|---|---|---|
| 7,013,469 | B2* | 3/2006 | Smith | G06F 9/465 |
| | | | | 719/315 |
| 7,870,538 | B2* | 1/2011 | Zenz | G06F 9/44505 |
| | | | | 717/121 |
| 8,782,637 | B2* | 7/2014 | Khalid | G06F 9/45508 |
| | | | | 718/1 |
| 9,355,478 | B2* | 5/2016 | Simon | G06T 11/206 |
| 9,953,009 | B1* | 4/2018 | Behar | G06F 40/106 |
| 10,297,064 | B2* | 5/2019 | Papp | G06T 13/80 |
| 10,679,414 | B2* | 6/2020 | Jacobson | G06F 3/04815 |
| 2009/0102846 | A1* | 4/2009 | Flockermann | G06T 11/206 |
| | | | | 345/440 |
| 2009/0249290 | A1* | 10/2009 | Jenkins | G06F 9/451 |
| | | | | 717/109 |
| 2010/0302249 | A1* | 12/2010 | Fowler | G06T 17/005 |
| | | | | 345/440 |
| 2014/0229865 | A1 | 8/2014 | Da Costa et al. | |
| 2015/0106750 | A1 | 4/2015 | Konami et al. | |
| 2017/0024447 | A1 | 1/2017 | Bowman, Jr. et al. | |
| 2019/0121874 | A1* | 4/2019 | Vilim | G06F 16/2246 |
| 2019/0188911 | A1* | 6/2019 | Jacobson | G06F 3/04842 |

OTHER PUBLICATIONS

Iliyan Georgiev, Jamie Portsmouth, Zap Andersson, Adrien Herubel, Alan King, Shinji Ogaki, and Frederic Servant. 2020. Autodesk Standard Surface. Retrieved from the Internet on Mar. 23, 2020 at URL: https://autodesk.github.io/standard-surface/.

He, Y., Fatahalian, K., & Foley, T. (2018). Slang: language mechanisms for extensible real-time shading systems. ACM Transactions on Graphics (TOG), 37(4), 1-13.

Rich Newman. Beginner's Guide to Techniques for Refreshing Web Pages: Ajax, Comet, HTML5. 2012. Retrieved from the Internet on Mar. 23, 2020 at URL: https://richnewman.wordpress.com/2012/09/08/beginners-guide-to-techniques-for-refreshing-web-pages-ajax-comet-html5/.

Parker, S. G., Bigler, J., Dietrich, A., Friedrich, H., Hoberock, J., Luebke, D., . . . & Stich, M. (2010). OptiX: a general purpose ray tracing engine. Acm transactions on graphics (tog), 29(4), 1-13.

Pixar Animation Studios. 2019. Introduction to USD. Retrieved from the Internet on Mar. 23, 2020 at URL: https://graphics.pixar.com/usd/docs/index.html.

Shapiro, M., Preguiça, N., Baquero, C., & Zawirski, M. (Oct. 2011). Conflict-free replicated data types. In Symposium on Self-Stabilizing Systems (pp. 386-400). Springer, Berlin, Heidelberg.

International Search Report and Written Opinion received for PCT Patent Application No. PCT/US2019/046218, dated Oct. 30, 2019, 10 pages.

International Preliminary Report on Patentability received for PCT Application No. PCT/US2019/046218, dated Feb. 25, 2021, 8 pages.

* cited by examiner

CLOUD-CENTRIC PLATFORM FOR COLLABORATION AND CONNECTIVITY ON 3D VIRTUAL ENVIRONMENTS

CROSS-REFERENCE TO RELATED APPLICATIONS

This application is a continuation-in-part of U.S. Non-Provisional application Ser. No. 16/538,594, titled "Platform and Method for Collaborative generation of Content," filed on Aug. 12, 2019, which is hereby incorporated by reference in its entirety.

BACKGROUND

Traditionally, content creation pipelines used to author high-quality three-dimensional (3D) worlds (e.g., for games, film, etc.) have been mostly linear. This is due, in part, to limitations on the ability of multiple content creators to work on the same asset or scene simultaneously while each is presented with a consistent and accurate state of the world. Often, no single content creation tool is optimal for every aspect of content creation, and different tools are generally not designed with interoperability in mind. For example, in a 3D content creation pipeline, concurrent collaboration may not be possible due to each tool (e.g., a modeling tool, an animation tool, a layout tool, a texture tool, a lighting tool, a rendering tool, etc.) having associated properties and formats that may not be understood by other tools, or may be interpreted inconsistently between tools when creating content to present to users.

Thus, in a typical pipeline, an author may use a tool to develop content that is stored in a file—and for another author to view the contents of that file—the entire file must be provided to that author's computer and imported into an application for further development of content. Importing and exporting between formats to translate between tools can result in the loss of data and can be a computationally expensive process. Additionally, even if formats can be retained, file sizes may be large—particularly for rich descriptions of complex scenes—resulting in long transfer times. Thus, content authors may take turns individually developing aspects of content using different tools that are suited for particular tasks. For example, an animation tool (e.g., Autodesk Maya®) can be used to create animations for a 3D world, a game engine, such as Unreal Engine, Unity, or CryEngine may be used for arranging layouts in the 3D world, Autodesk 3D Studio Max® may be used for defining 3D geometry, and Adobe Photoshop® may be used for texturing and lighting.

Game engines—such as Unreal Engine, Unity, and CryEngine—have been used to enable users to collaborate in a rudimentary form of content creation within a gaming context. However, traditional game engines are not particularly suitable for collaboratively authoring high quality content of a 3D world. For example, replication of content to users in a game engine is designed for runtime where the game engine may replicate content to each player to allow the players to experience gameplay together in real time. To accomplish this, game engines are designed for fast replication over fidelity and consistency. Thus, each client may receive an estimate of a shared 3D environment that is accurate enough to share and convey a gameplay experience. However, high quality collaborative 3D content authoring may require each participant to view a faithful and consistent representation of the shared 3D environment. Additionally—to facilitate the fast replication—game engines provide clients with a simple atomic-level description of the 3D world, which may include object geometry and transforms. However, authoring high-quality 3D worlds may require the exchange of rich descriptions of the world in order to support the fidelity and features required by modern content authoring tools.

SUMMARY

The present disclosure relates to approaches for cloud-centric platforms for collaboration and connectivity on 3D virtual environments.

Aspects of the disclosure provide for the fast and bi-directional (e.g., between client and server) replication of content while exchanging rich descriptions of 3D virtual environments with fidelity and consistency. Multiple content creators may work on the same asset or scene simultaneously while being presented with a consistent and accurate shared state.

A content management system may maintain a scene description that represents a 3D virtual environment with support for rich relationships between assets. A publish/subscribe model may be implemented in which clients subscribe to content items that correspond to respective portions of the shared scene description. When changes are made to content, the changes may be served to subscribing clients. Clients may resolve different properties and values for the same assets in composing the 3D virtual environment, as they may subscribe to different subsets of scene description that they use to resolve the assets. Further, rather than transferring entire descriptions of assets to propagate changes, differences between versions of content may be exchanged, which may be used to construct updated versions of the content. In further respects, portions of scene description may reference other content items and clients may determine whether to request and load these content items for lazy loading. Content items may be identified by Uniform Resource Identifiers (URIs) that may be used to reference the content items. The content management system may maintain states for client connections including for authentication, for the set of subscriptions in the publish/subscribe model, and for their corresponding version identifiers.

BRIEF DESCRIPTION OF THE DRAWINGS

The present systems and methods for cloud-centric platforms for collaboration and connectivity on 3D virtual environments is described in detail below with reference to the attached drawing figures, wherein.

DETAILED DESCRIPTION

Figure 1:
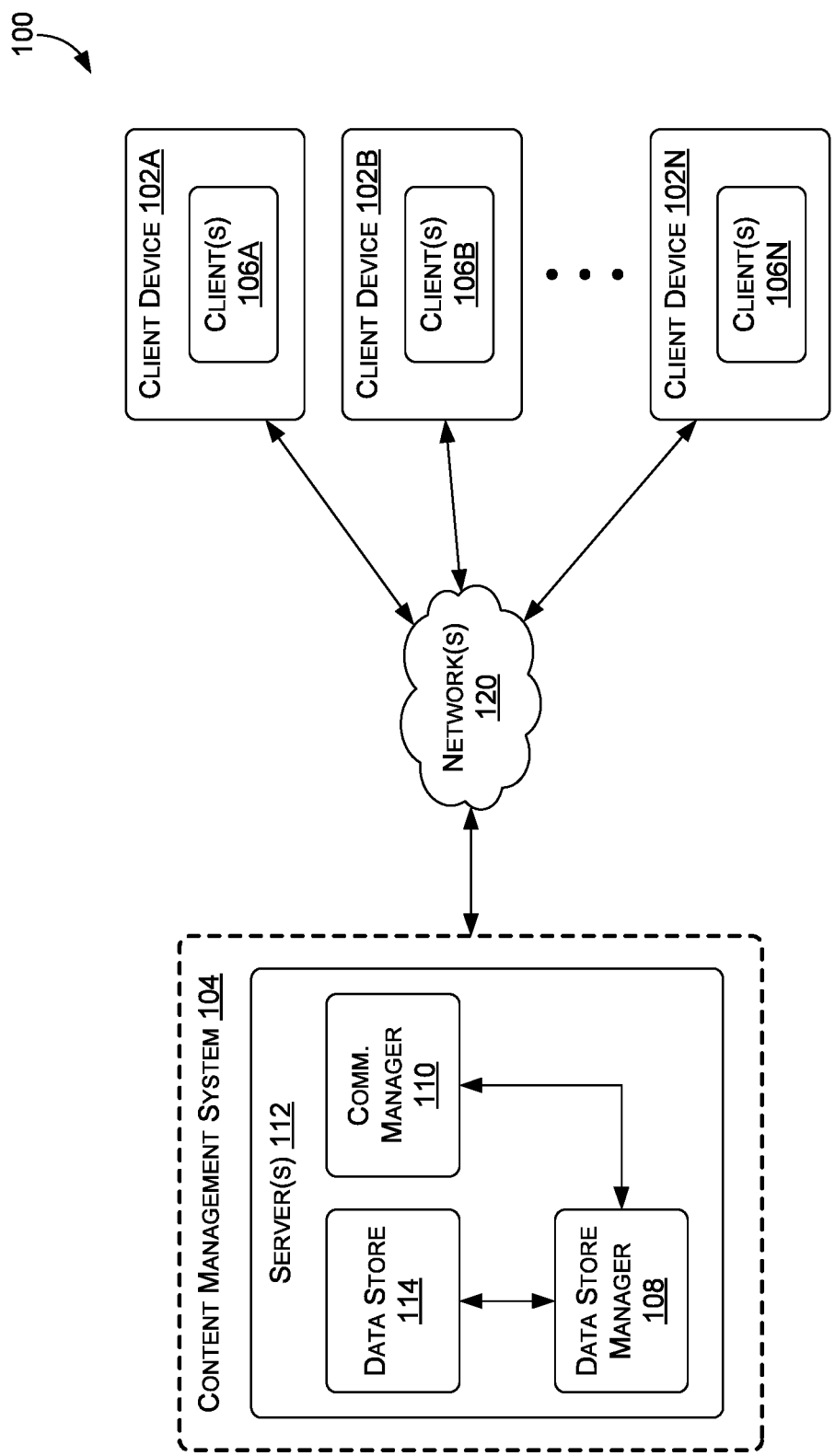
FIG. 1 is diagram illustrating an example of an operating environment that may be used to collaboratively author shared content, in accordance with some embodiments of the present disclosure.

The present disclosure relates to cloud-centric platforms for collaboration and connectivity on 3D virtual environments. The present disclosure provides, in part, approaches for implementing computing platforms that are capable of facilitating concurrent collaboration and connectivity between users in authoring and sharing high-quality 3D worlds (e.g., for games, film, etc.).

Aspects of the disclosure provide for the fast and bi-directional (e.g., between client and server) replication of content throughout content creation platforms while exchanging rich descriptions of 3D virtual environments with fidelity and consistency. Thus, multiple content creators may work on the same asset or scene simultaneously while each is presented with a consistent, current, and accurate state. Additionally, disclosed approaches may allow for the content creators to use diverse content creation tools without needing to manually export, exchange, then import entire files in order to view each other's work. As such, data loss, the consumption of computational resources, and long transfer times can be avoided.

In some respects, a content management system may maintain a scene description that represents elements of a 3D virtual environment with support for rich relationships between assets, in which assets may contain other assets, may be instantiated from other assets, may reference other assets, and/or may incorporate or inherit one or more portions of other assets. Assets may be described in terms of properties and values, and the properties and values of a particular asset may be defined and/or inherited through the asset relationships defined in the scene description, as well as overrides to one or more inherited properties (e.g., via layering and/or explicit overrides).

In some respects, a publish/subscribe model may be operated by the content management system in which clients may subscribe to any number of content items that are represented as respective portions of the scene description. A content item may refer to an individually identifiable and/or addressable (e.g., via a URI and/or other identifier(s)) asset(s) or element(s) of an asset(s) (and/or version thereof), such as one or more properties or property-value pairs. Elements of an asset may include structural and/or non-structural elements, as described herein. When a portion of the scene description is modified by a client or the content management system, changes thereto may be served on an as needed or as desired basis to subscribing clients and services. Different clients or services may subscribe to different subsets of the scene description. Because the clients or services may use those subsets to resolve properties and values of assets for the 3D virtual environment, and because those subsets may collectively capture different asset relationships and overrides, different clients are capable of resolving different properties and values for assets of the 3D virtual environment. This may allow for functionality such as non-destructive editing of data and different clients may view and operate on different aspects of the same scene description that is maintained at the content management system and shared amongst subscribing software.

In further respects, rather than transferring entire descriptions of assets and/or files of a 3D virtual environment to propagate changes, clients and the content management system may exchange data representative of differences between versions of content, which may be used to construct the updated version of the content, significantly reducing the amount of data that needs to be transferred for replication. For example, when a client subscribes to content items, the client may be provided with current versions of each content item. Changes to portions of scene description may be tracked with respect to those versions of the content items, and difference data may be provided to the content management system for distribution to other subscribing clients.

In further respects, a portion of scene description for a content item may include references to one or more other portions of scene description for incorporation into the content item. These referenced portions may correspond to other content items and may be referred to as payloads. References to payloads may be identified at clients to determine whether or not to request the corresponding portion(s) of content from the content management system using the reference(s). If received, a payload may itself include additional references to payloads. This may be used to enable the lazy and selective loading of content items. Additionally, payloads may be subscribed to and unsubscribed from similar to other content items, allowing a client to selectively receive portions of a scene description.

In further respects, content items and/or resources thereof may be referenced by clients for identification at one or more content management systems using a URI which may be in the form of a text string—such as a Uniform Resource Locator (URL). For example, the URI may be used to refer to content items at any level of the scene description including content items referenced within scene description for other content items (e.g., payloads). A name resolution system, such as a Domain Name System (DNS), may be used to resolve URIs from clients to particular addresses—such as Internet Protocol (IP) addresses—so that corresponding messages are routed to the appropriate content management system and/or server that hosts the content item. In some aspects of the disclosure, using stateful connections to the content management systems—in combination with incremental updates to content, name resolution, and rich descriptions of 3D virtual environments—may provide a high performance and practical foundation for a true 3D Internet.

With reference to FIG. 1, FIG. 1 is diagram illustrating an example of an operating environment 100 that may be used to collaboratively author shared content, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. By way of example, the operating environment 100 may be implemented on one or more instances of the computing device 1100 of FIG. 11.

The operating environment 100 may include any number of clients, such as client(s) 106A and 106B through 106N (also referred to as "client(s) 106") and a content management system 104. These components may communicate with each other via a network(s) 120, which may be wired, wireless, or both. The network 120 may include multiple networks, or a network of networks, but is shown in simple form so as not to obscure aspects of the present disclosure. By way of example, the network 120 may include one or more wide area networks (WANs), one or more local area networks (LANs), one or more public networks such as the Internet, and/or one or more private networks. Where the network 120 includes a wireless telecommunications network, components such as a base station, a communications tower, or even access points (as well as other components) may provide wireless connectivity.

Each client 106 may correspond to one or more applications, software tools, and/or services that can be executed on or using one or more computing devices, such as client devices 102A and 102B through 102N (also referred to as "client devices 102"). The client devices 102 may include different types of devices; that is, they may have different computational and display capabilities and different operating systems. Depending on hardware and software capabilities, the client devices 102 may be used to implement the client(s) 106 as either thick clients or thin clients.

Figure 11:
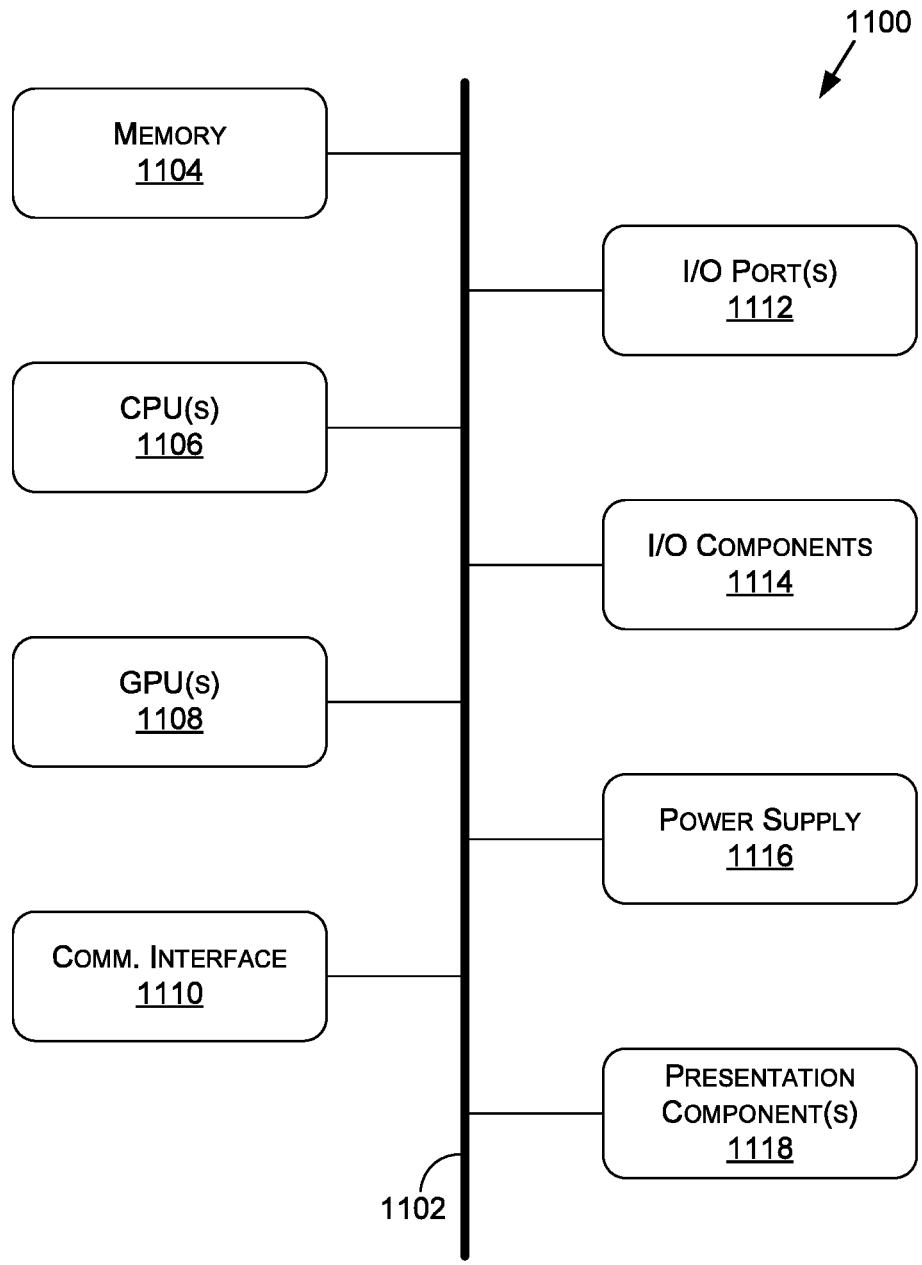
FIG. 11 is a block diagram of an example computing device suitable for use in implementing some embodiments of the present disclosure.

Each client device 102 may include at least some of the components, features, and functionality of the example computing device 1100 described herein with respect to FIG. 11. By way of example and not limitation, any of the client devices 102 may be embodied as a personal computer (PC), a laptop computer, a mobile device, a smartphone, a tablet computer, a smart watch, a wearable computer, a personal digital assistant (PDA), a media player, a global positioning system (GPS) or device, a video player, a server device, a handheld communications device, a gaming device or system, an entertainment system, a vehicle computer system, a remote control, an appliance, a consumer electronic device, a workstation, any combination of these delineated devices, or any other suitable device.

Each client device 102 may include one or more processors, and one or more computer-readable media. The computer-readable media may include computer-readable instructions executable by the one or more processors. The instructions, when executed by the one or more processors, may cause the one or more processors to perform any combination and/or portion of the methods described herein and/or implement any portion of the functionality of the operating environment 100 of FIG. 1 (e.g., to implement the client(s) 106).

The content management system 104 includes a data store(s) 114, a data store manager(s) 108, and a communications manager(s) 110, which may be implemented on, for example, one or more servers, such as a server(s) 112. Each server 112 may include one or more processors, and one or more computer-readable media. The computer-readable media may include computer-readable instructions executable by the one or more processors. The instructions, when executed by the one or more processors, may cause the one or more processors to perform any combination and/or portion of the methods described herein and/or implement any portion of the functionality of the operating environment 100 of FIG. 1 (e.g., to implement the data store manager 108 and/or the communications manager 110).

The data store(s) 114 may comprise one or more computer-readable media. For example, the data store(s) 114 may refer to one or more databases. The data store 114 (or computer data storage) is depicted as a single component, but may be embodied as one or more data stores (e.g., databases) and may be at least partially in the cloud. For example, the data store 114 can include multiple data stores and/or databases that are implemented and stored on one or more computing systems (e.g., a datacenter).

The operating environment 100 may be implemented as a cloud-centric platform. For example, the operating environment 100 may be a web-based platform that can be implemented using one or more devices connected and working cooperatively via the network 120 (e.g., the Internet). However, while the operating environment 100 is primarily described in terms of a client-server architecture, different arrangements are contemplated to account for different network architectures, such as peer-to-peer networks, or hybrid network types. Although depicted within the server(s) 112, the data store(s) 114 may be at least partially embodied on any combination of the server(s) 112, the client devices 102, and/or one or more other servers or devices. Thus, it should be appreciated that information in the data store(s) 114 may be distributed in any suitable manner across one or more data stores for storage (some of which may be hosted externally). Similarly, functionality of the data store manager(s) 108, the communications manager(s) 110, and/or the client(s) 106 may be at least partially embodied on any combination of the server(s) 1102, the client devices 102, and/or on or more other servers or devices.

As an overview, the data store(s) 114 of the content management system 104 may be configured to store data representative of assets and metadata used to define one or more 3D environments, such one or more 3D scenes and/or 3D worlds. The data store manager 108 of the content management system 104 may be configured to manage the assets and the metadata in the data store(s) 114, including resolving properties and/or values of 3D virtual environments. The communications manager 110 of the content management system 104 may be configured to manage communications provided by or to the content management system 104, such as over the network 120, and/or communications within the content management system 104.

In at least one embodiment, the communications manager 110 of the content management system 104 may be configured to establish and maintain one or more communications channels with one or more of the client(s) 106. For example, the communications manager 110 may provide a respective bidirectional communications channel(s) to each client 106. In various embodiments, a bidirectional communications channel comprises one or more network sockets (e.g., WebSockets) and/or one or more ports. In embodiments, one or more of the client(s) 106 connects to the server(s) 112 through a port or socket, and communicates with the server(s) 112 using a common Application Programming Interface (API) that enables bidirectional communication (e.g., the WebSockets API) over the bidirectional communications channel(s). In accordance with disclosed embodiments, assets of a virtual environment may be defined in a scene description, which may be in the form of a scene graph comprising properties and values, and/or a language (in textual form) that describes the properties and values according to one or more schemas. Changes to portions of scene descriptions (e.g., textual description) at the server(s) 112 may be replicated to the client(s) 106 over the channel(s), and vice-versa.

The client(s) 106 may include one or more types of applications, software, and/or services, such as, but not limited to: a physics simulation application, an artificial intelligence (AI) application, a global illumination (GI) application, a game engine, a computer graphics application, a renderer, a graphics editor, a virtual reality (VR) application, an augmented reality application, or a scripting application. In embodiments where the applications or services are different from each other, the client(s) 106 may be referred to as "heterogeneous clients."

As mentioned, the data store(s) 114 of the content management system 104 may be configured to store data representative of assets and metadata used to define one or more elements of 3D environments, such one or more 3D scenes and/or 3D worlds. A content item may refer to an individually identifiable and/or addressable (e.g., via a URI and/or other identifier(s)) asset(s) or element(s) of an asset(s) (and/or version thereof), such as one or more properties or property-value pairs. Elements of an asset may include structural and/or non-structural elements, as described herein. Metadata (e.g., in a JSON) for content items may describe where the underlying data is located, Access Control Lists (ACLs) for which users are allowed to view and/or modify a content item, timestamps, lock and unlock statuses, data type information, and/or other service information. Many of the changes to data in the data store(s) 114 may operate on the metadata as opposed to the underlying data. For example, a copy operation may not be deep, as it may be accomplished by copying the metadata information and creating a link to the same underlying data, such as to fork content as described herein.

Metadata and the underlying data may be stored separately in the data store(s) 114 as they scale differently. In-memory key-value databases may be employed with a metadata database(s) and data database(s). Multiple database instances (e.g., on any number of machines) may be provided for scaling and may include one or more read slaves to better scale read performance by replicating master instances. The data store manager 108 may reference and locate content items and associated metadata in the data store(s) 114 by a Uniform Resource Identifier (URI). In some embodiments, the data store manager 108 may hash a URI to determine location information and to select an appropriate database instance to access. In non-limiting examples, instances may be single threaded with one run per-CPU core.

The data store manager 108 may operate one or more delta servers (e.g., one per metadata instance). A delta server may coalesce or collapse a series of delta changes (e.g., to scene description) into a new version of content, as described herein. For example, the changes may be received from a particular client 106 and may be collapsed into a keyframe version that is shared with other client(s) 106 so that the new incoming client(s) 106 may receive a relatively compact version of the content that reflects the changes.

Examples of Assets

An asset may correspond to data (e.g., 3D data) that can be used with other assets to compose a 3D virtual environment. A "virtual environment" may refer to a virtual scene, world, or universe. Virtual scenes can be combined to form virtual worlds or universes. Each asset may be defined in terms of one or more properties, one or more values of the one or more properties (e.g., key-value pairs with properties being the keys), and/or one or more other assets and/or content items (e.g., via properties and values and/or syntax). Examples of assets include layers, objects (e.g., models and/or model groups), stages (top level or root scene graphs), scenes, primitives, classes, and/or combinations thereof. The assets of a virtual environment may be defined in a scene description, which may be in the form of a scene graph comprising properties and values. Further, in various embodiments, content items of some assets may be described and defined across a number of other assets and/or across a number of files (e.g., of scene description) and/or data structures.

Non-limiting examples of properties and/or values of the properties are those that may specify and/or define one or more portions of geometry, shaders, textures, geometric variations, shading variations, Level-of-Detail (LoD), asset references or identifiers, animations, special effects, timing information, model rigging information, virtual camera information, lighting information, compositing information, references (e.g., referred to below with respect to referencing assets) thereto and/or instantiations thereof (e.g., referred to below with respect to instantiated assets). In various examples, properties and/or values of the properties for assets may be time varying, such as by being defined by scripts and/or functions.

Assets may be defined, specified, formatted, and/or interfaced with in accordance with one or more schemas, one or more domain-specific schemas, and/or one or more scene description languages. In non-limiting examples, the schema, format, languages, and/or interfaces (e.g., APIs) may be in accordance with the Universal Scene Description (USD) framework. The data store manager 108 and/or the client(s) 106 (and/or content managers 410, renderers 414, services 412, described herein) may analyze asset definitions of a scene description in order to resolve the properties and values of assets of a 3D virtual environment. Schemas may ascribe meanings to the properties and values of the scene description (e.g., written in textual form using a scene description language), such as (for example and without limitation) any or a combination of: geometry, lights, physics (e.g., for rigid bodies, flexible materials, fluids and gases), materials, rigs, and the way their properties vary over time. Physics parameters may be included for specifying physical properties like mass, inertia tensors, coefficients of friction and coefficients of restitution, with specifications of joints, hinges and other rigid-body constraints. Users may extend a scene graph by adding custom properties embedded in new schemas.

In various examples, an asset(s) definition of a scene description may therein specify and/or define one or more other assets and/or one or more portions (e.g., properties and/or values) of other assets therein (e.g., in a layer). In such examples, an asset may be referred to as a containing asset, or container of the other asset(s), and the other asset(s) may be referred to as a nested asset with respect to the containing asset. For example, a layer may include one or more objects at least partially defined therein. In embodiments, any of the various asset types described herein may be a containing asset and/or a nested asset with respect to another asset. Further, a containing asset may be a nested asset of any number of other containing assets and/or may include any number of nested assets, any of which themselves may be a containing asset of one or more other assets.

Also in various examples, an asset(s) may be specified and/or defined in scene description as an instantiation of one more other assets and/or one or more portions (e.g., properties and/or values) of other assets (e.g., of a class). In such examples, an asset may be referred to as an instantiated asset, or instance of the other asset(s), and the other asset(s) may be referred to as a source asset with respect to the instance asset. In embodiments, any of the various asset types described herein may be a source asset and/or an instantiated asset with respect to another asset. For example, an object may be an instantiation of a class. Further, an instantiated asset may be a source asset of any number of other instantiated assets and/or may include any number of source assets, any of which themselves may be an instantiated asset of one or more other assets. In various embodiments, an instantiated asset may inherit from any number of source assets (e.g., classes). Multiple inheritance may refer to where an instantiated asset inherits from more than one source asset. For example, an object or class can inherit properties and/or values from more than one parent object or parent class. Further, as with other asset types, the parent object or parent class may be defined and resolved across any number of layers, as described herein.

Additionally, one or more properties and/or values of an asset(s) may be defined in a scene description by one or more references to one or more other assets and/or one or more instantiations of one or more other assets (e.g., via properties and values). An asset(s) may include a reference (e.g., an identifier), or pointer, to another asset that incorporates one or more portions of that other asset into the asset. In such examples, the asset may be referred to as a referencing asset and the other asset may be referred to as an incorporated asset with respect to the referencing asset. In embodiments, any of the various asset types described herein may be a referencing asset and/or an incorporated asset with respect to another asset. Further, a referencing asset may be an incorporated asset of any number of other referencing assets and/or may include any number of incorporated assets, any of which themselves may be a referencing asset of one or more other assets.

Various combinations of containing assets, nested assets, instantiated assets, source assets, referencing assets, and/or incorporated assets may be used in scene description to collectively define properties and corresponding values of assets for a 3D virtual environment. According to one or more schemas, these relationships may be defined or specified explicitly via properties and values and/or implicitly from the structure of the scene description. For example, an asset being specified and/or defined as an instantiated asset may cause the asset to inherit one or more properties and/or values from a source asset. Also, an asset being specified and/or defined as an incorporated asset to a referencing asset may cause the referencing asset to inherit one or more properties and/or values from the incorporated asset.

Furthermore, in at least one embodiment, one or more properties of an asset(s) that is inherited from one or more other assets may be defined and/or specified in scene description with an override to the one or more properties from the other asset. An override to a property may, for example, replace or supersede the value(s) of the property and/or the property with a different value(s) and/or property. An override for an asset may be explicitly declared or specified using a property and value according to a syntax or schema of asset descriptions (e.g., in the asset definition), and/or may be implicit from the syntax or schema (e.g., according to where the asset is declared). For example, an assignment of a value to a property in an asset may serve as an explicit override to a value of that property that is inherited from another asset.

In at least one embodiment, a layer may be provided in a scene description of a 3D virtual environment. A layer may contain or group zero or more other asset types such as objects and classes, which in turn may describe values for properties of those and/or other assets. In some examples, each layer may include an identifier that can be used to construct references to the layer from other layers. In some embodiments, each layer corresponds to a respective file (e.g., of scene description) used to represent the layer within the data store 114.

Each layer may be assigned (e.g., by a client, a user, and/or the data store manager 108) a ranking with respect to other layers of a 3D virtual environment. The data store manager 108 and/or the client(s) 106 may use the rankings to resolve one or more properties and/or values of assets of the 3D virtual environment. For example, the data store manager 108 may determine properties and values as a merged view of the assets in one or more of the layers by combining the asset definitions of the scene description in accordance with the rankings. In one or more embodiments, layers may express or define "opinions" on properties and/or values of assets of a composed 3D scene and the data store manager 108 may use the opinion of the strongest or highest ranking layer when combining or merging scene description of multiple layers. In at least one embodiment, the strength of a layer may be defined by a position of the layer in an ordered list or stack of layers. For example, the list or stack may be ordered from strongest layer to weakest layer. Layers may be used to modify properties and/or values of existing assets in scene description without modifying their source in order to change virtually any aspect by overriding it in a stronger layer.

In at least one embodiment, scene description of a virtual environment may be resolved to a tree structure of a transformation hierarchy (e.g., a scene graph). Relationships between layers may be used to change properties and/or values of assets anywhere in the transformation hierarchy by affecting the way one or more aspects of assets of the 3D virtual environment are composed or resolved into the tree structure (e.g., according to the rankings). For example, the objects or other assets within the layers may be included in different leaves of the transformation hierarchy. Use of layers may allow properties and values across objects or other assets in a layer (or group) to be changed. For example, an engine and doors of a car may be represented as different objects in a transformation hierarchy. However, the engine and the doors may both include screws, and layers may be used to permit properties of the screws to be changed no matter where the screws appear in the transformation hierarchy.

Thus, assets of a scene may be defined and described in one or more hierarchies of asset definitions of scene description, which may collectively define properties and values of the assets or elements of a 3D scene. Non-limiting examples of hierarchies include model hierarchies, transformation hierarchies, layer hierarchies, class hierarchies, and/or object hierarchies, one or more of which may be embedded within another hierarchy and/or hierarchy types.

In various examples, the data store manager 108 may analyze the asset definitions of scene description, the metadata, and/or the associated properties and/or values specified by the asset definitions (in accordance with the hierarchies) in order to resolve one or more of the properties and/or values associated with one or more particular assets or elements of a 3D virtual environment. This may include, for example, traversing one or more of the hierarchies, data structures, and/or portions thereof, to resolve the properties and values. For example, the data store manager 108 may access specified references to assets and/or instantiations thereto defined by the scene description in order to traverse a hierarchy.

Figure 2A:
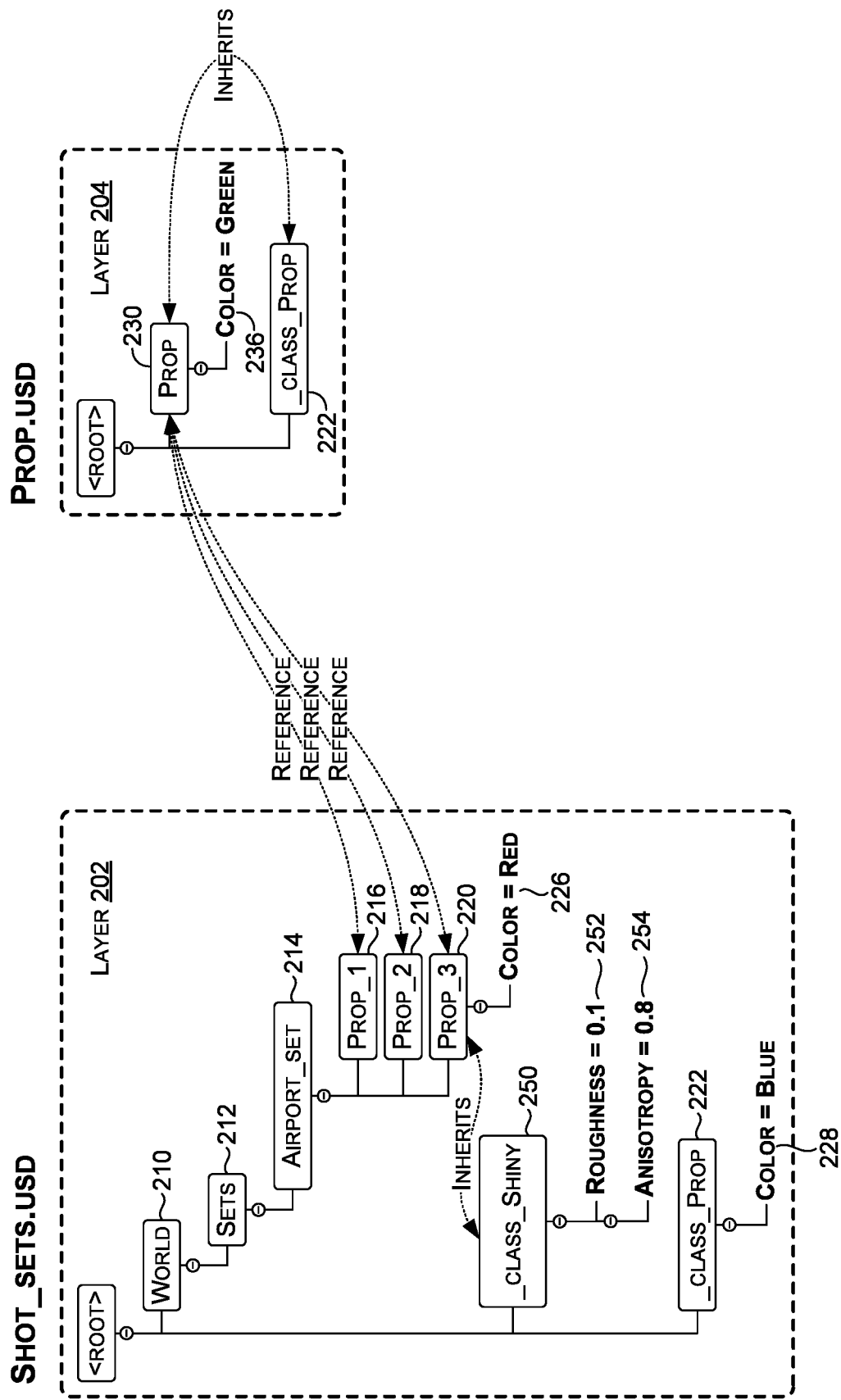
FIG. 2A illustrates an example of how properties and values of assets of a 3D virtual environment may be defined, in accordance with some embodiments of the present disclosure.
Figure 2B:
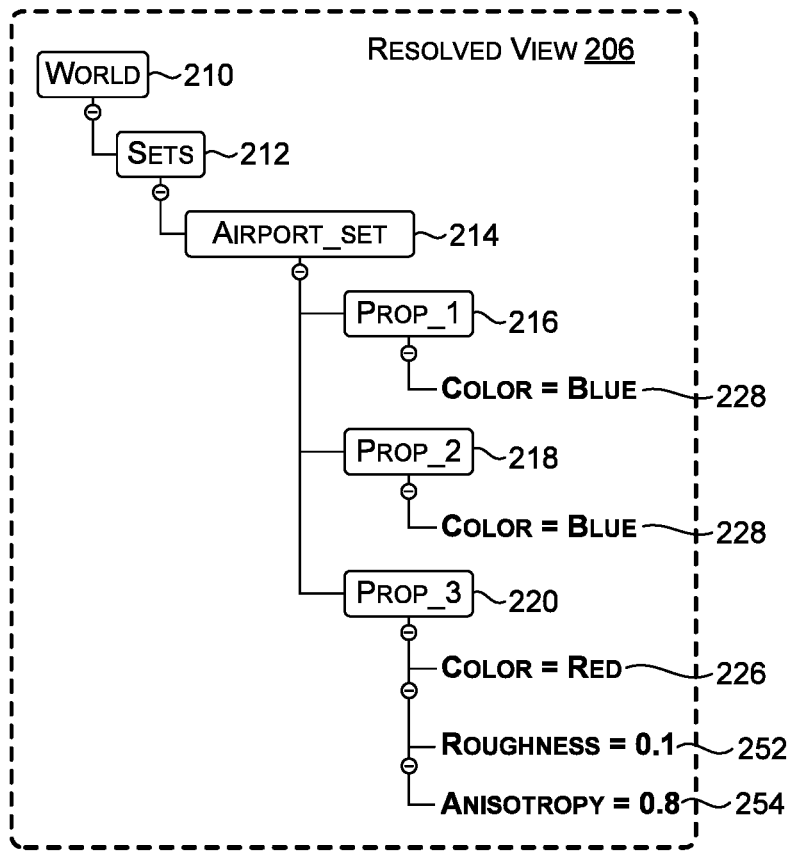
FIG. 2B illustrates an example of how the properties and values of FIG. 2A may be resolved, in accordance with some embodiments of the present disclosure.

Referring now to FIG. 2A and FIG. 2B, FIGS. 2A and 2B illustrate an example of how properties and values of assets of a 3D virtual environment may be defined and resolved, in accordance with some embodiments of the present disclosure. Elements, or assets, of FIG. 2A may be referred to unresolved elements, or assets of scene description, and elements, or assets, of FIG. 2B may be referred to as resolved, or composed elements, or assets of the scene description. FIG. 2A shows a layer 202 and a layer 204 which may be defined according to a scene description of a 3D virtual environment, and FIG. 2B shows a resolved view 206 of the 3D virtual environment. The scene description of the 3D virtual environment may include additional assets, such as additional layers, which are not shown in FIGS. 2A and 2B. The layer 202 may include definitions for assets 210, 212, 214, 216, 218, 220, 216, 218, 220, 222, and 250, and the layer 204 may include definitions for the assets 230, 216, and 222.

In the example shown, the assets 216, 218, and 220 may each be defined in scene description as referencing assets to the asset 230 of the layer 204, which may be an incorporated asset with respect to the assets 216, 218, and 220. Thus, the assets 216, 218, and 220 may each inherit properties and/or values from the asset 230. The scene description for the asset 230 may include a property-value pair 236 assigning a color property to green. However, the asset 230 may be defined as an instantiated asset of the asset 222, which is a source asset with respect to the asset 230 (e.g., a class). Thus, the asset 230 may inherit a property-value pair 228 from the asset 222 assigning the color property to blue. The layer 202 may be ranked as a stronger layer than the layer 204. Thus, the property-value pair 228 may override the property-value pair 236 for the asset 230. As such, the assets 216, 218, and 220 may each also inherit the property-value pair 228 from the asset 230. However, the scene description for the asset 220 may include a property-value pair 226 which may override the property-value pair 228. As such, the data store manager 108 may resolve the asset 216 as having the property-value pair 228, the asset 218 as having the property-value pair 228, and the asset 220 as having the property-value pair 226, as shown in the resolved view 206.

Additionally, the asset 220 may be defined as an instantiated asset of the asset 250, which is a source asset with respect to the asset 220 (e.g., a class). Thus, the asset 220 may inherit property-value pairs 252 and 254 from the asset 250 and the property-value pair 228 from the asset 222 (which is overridden in this example) providing an example of multiple inheritance where an instantiated asset may have multiple source assets. For example, the asset 220 is an instantiation of multiple classes. Another asset (not shown), may also inherit from a different set of classes that may or may not include the asset 250 and/or the asset 222. For example, the asset 220 may represent a propeller of an airplane and both the asset 220 and an asset representing an airport hangar could inherit from the asset 250 so they each include properties of a shiny metal surface. Thus, in various embodiments, property inheritance may operate along a transform hierarchy, as well as from multiple classes.

The layers 202 and 204 may be defined by scene description in terms of scene graphs, which resolve to a scene graph of the resolved view 206, as shown (e.g., by merging the scene graphs according to resolution rules). A resolved view may be composed from any number of layers and/or constituent scene graphs. Some properties and values of a scene graph may define or declare structure of the scene graph by declaring objects, or nodes, of the scene graph, and/or relationships between the nodes or objects. These properties and values may be referred to as structural elements of the scene description. Examples of structural elements that define or declare relationships include a structural element(s) that declares or define an instantiation of a class or other asset, a reference to another object, or asset, and/or an inheritance relationship between objects, or assets. Generally, in FIG. 2A the visually depicted graph nodes, as well as the interconnections shown between nodes, may each correspond to a structural element. An example of a structural element is a declaration of the asset 222 in the layer 202 of FIG. 2A. Further examples of structural elements may be a declaration of the reference relationship between the assets 216 and 230 that is indicated in FIG. 2A, as well as declarations of the inheritance relationships between the asset 250 and the asset 220 and between the asset 230 and the asset 222.

Other properties and values may define or declare fields and values that belong to the objects, or nodes, of the scene graph. These properties and values may be referred to as non-structural elements of the scene description. An example of a non-structural element is a declaration of the property-value pair 228 for the asset 222 in the layer 202 of FIG. 2A. Generally, in FIG. 2A the elements that are attached to the visually depicted graph nodes may each correspond to a non-structural element.

While the resolved view 206 of FIG. 2B shows resolved elements—such as assets (or objects) and corresponding property-value pairs—resulting from each unresolved element depicted in the layers 202 and 204 of FIG. 2A, the client(s) 106, the content management system 104, and/or other component may determine resolved elements on an as needed or as desired basis (by resolving and/or traversing one or more portions or subsets of the scene description) and may not necessarily resolve each element from the unresolved scene description. Generally, a resolved view or scene description may refer to a state of a 3D virtual environment that is manifested or composed from the scene description. One or more elements of a resolved view may be what is rendered and/or presented for the 3D virtual environment.

In embodiments, a client 106 and/or other component of the operating environment 100 may resolve portions of scene description that are available and/or active for composition. For example, a client 106 may resolve the portions, or content items, of the scene description that the client 106 is subscribed to and may not use unsubscribed portions, or content items for resolution or composition of one or more portions of a resolved view. This may result in different clients 106 using different resolved views of the same shared scene description. For example, if the client 106A is subscribed to the layers 202 and 204, the client 106A may use the resolved view 206 of FIG. 2B. However, if the client 106B is subscribed to the layer 202 and not the layer 204, the resolved view used by the client 106B may be different. For example, the assets 216, 218, and 220 may no longer inherit from the asset 222 so that the color property of the assets 216 and 218 no longer resolve to blue, as in FIG. 2B. To further the example, the client 106B may be subscribed to another layer (not shown) that provides a different definition for the asset 230 than the layer 204, resulting in different properties and values for the assets 216, 218, and 220. Additionally, that other layer might also be subscribed to by the client 106A, but is not manifested in the resolved view 206 because it has a lower ranking than the layer 204. With the layer 204 unavailable and/or inactive for the client 106B, one or more elements that were previously overridden from the other layer may now be manifested in the resolved view for the client 106B.

Figure 2C:
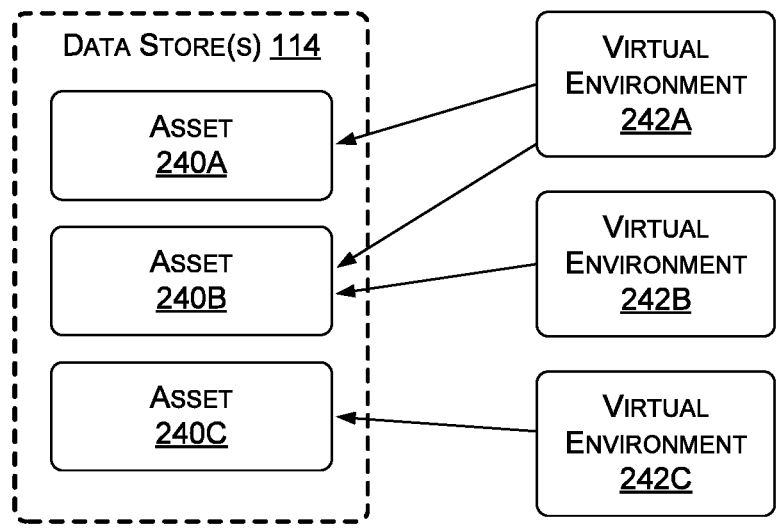
FIG. 2C is a block diagram illustrating an example of the use of a data store to create multiple virtual environments, in accordance with some embodiments of the present disclosure.

Referring now to FIG. 2C, FIG. 2C is a block diagram illustrating an example of the use of a data store to create multiple virtual environments, in accordance with some embodiments of the present disclosure. In the example of FIG. 2C, assets 240A, 240B, and 240C (or more generally content items) described in the data store 114 may be referenced by scene description for different virtual environments 242A, 242B, and 242C. For example, the asset 240A may be used in both of the virtual environments 242A and 242B. As an example, the asset 240B may be defined in at least some scene description of the virtual environment 242B and referenced by or instanced from at least some scene description of the virtual environment 242A, as described herein. For example, a scene description of a layer may be shared between scene descriptions of multiple virtual environments.

Figure 2D:
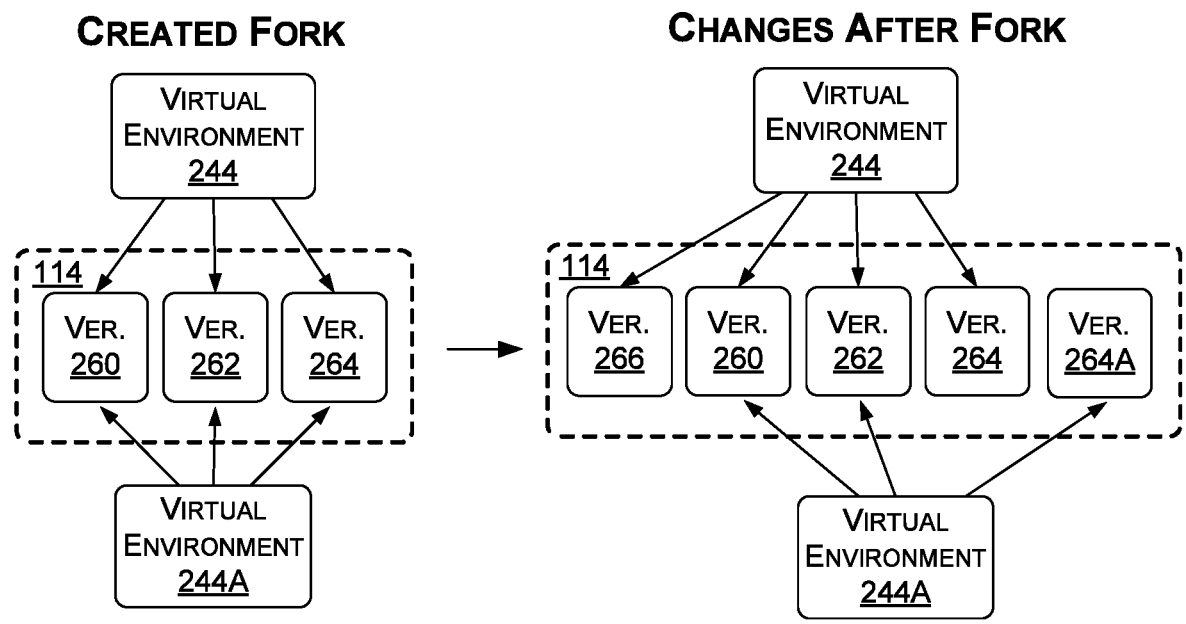
FIG. 2D is a block diagram illustrating an example of the use of a data store for virtual environment forking, in accordance with some embodiments of the present disclosure.

Referring now to FIG. 2D, FIG. 2D is a block diagram illustrating an example of the use of the data store 114 for virtual environment forking, in accordance with some embodiments of the present disclosure. For example, a virtual environment 244 may be forked to create a virtual environment 244A. Forking virtual environments into multiple copies may be a relatively inexpensive (computationally) operation. For examples, forking a virtual environment may be implemented by creating a new source control branch in a version control system. References to one or more asset version in the data store 114 may be copied from the virtual environment 244 to the virtual environment 244A, as indicated in FIG. 2D. Thus, to fork the virtual environment 244A from the virtual environment 244, corresponding asset names for the virtual environment 244A may be configured to point to asset versions 260, 262, and 264 of the virtual environment 244. In some embodiments, a Copy-on-Write (CoW) resource-management scheme may be employed so that asset versions that are copied are shared initially amongst the virtual environment 244 and the virtual environment 244A, as indicated in FIG. 2D. Once forked, scene description of the virtual environments 244 and/or 244A may be modified to differentiate the virtual environments such as though overrides, additional asset definitions, and/or changes made to asset versions. One or more changes made to the virtual environment 244 may be made without impacting the virtual environment 244A and vice versa. For example, if a user modifies an asset corresponding to the asset version 264 in the virtual environment 244A, an asset name for the virtual environment 244A may be updated to point to a new asset version 264A while retaining the asset version 264 for the virtual environment 244, as shown in FIG. 2D. If a user adds a new asset to the virtual environment 244, the asset name for the virtual environment 244 may be created and may point to a corresponding asset version 266, as shown in FIG. 2D. Although not shown, if the new asset is declared in an asset that has shared asset version between the virtual environments 244A and 244, that change to the asset may also result in a new asset version for that asset (as the virtual environments 244A and 244 may each be represented using a number of interrelated assets and/or files). In some embodiments, any of these asset versions may be subject to being coalesced, as described herein. One or more of the client(s) 106 may request (e.g., at the direction of a user or algorithm) that a version of the 3D virtual environment and/or one or more particular content items thereof be persistently stored on the content management system 104 to guarantee recoverability.

Referring now to FIGS. 3A-3D, FIGS. 3A-3D illustrate examples of displays of graphical representations of a 3D virtual environment, in accordance with some embodiments of the present disclosure. In accordance with embodiments of the present disclosure, displays 300A, 300B, 300C, and 300D in FIGS. 3A-3D may be presented by any combination of the client(s) 106 and/or client devices 102 of FIG. 1. As examples, all of the displays 300A, 300B, 300C, and 300D may be presented by a same client 106 and/or a same client device 102 (e.g., in different windows and/or on different monitors). As further examples, the displays 300A, 300B, 300C, and 300D may each be presented by a respective client 106 and/or a respective client device 102.

The displays 300A, 300B, 300C, and 300D in FIGS. 3A-3D are renderings of a same scene description of a 3D virtual environment. In particular, the displays 300A, 300B, 300C, and 300D may each correspond to a same scene definition or description and version of the 3D virtual environment that is shared by the client(s) 106 via the content management system 104. However, the graphical representations of the 3D virtual environment may appear different within each client for various possible reasons. For example, a client 106 and/or the data store manager 108 may deactivate and/or activate one or more descriptions of assets and/or portions thereof in the scene description of the 3D virtual environment. As another example, one or more descriptions of assets and/or portions thereof in the scene description of the 3D virtual environment may be unavailable for asset resolution due to lack of permissions for a client and/or user. When resolving assets of the 3D virtual environment, the data store manager 108 and/or the client 106 (and/or content manager 410) may exclude unavailable and/or inactive portions of the scene description (e.g., when traversing hierarchies defined by the scene description). This may result in different property and value resolutions that are reflected in the graphical representations.

To illustrate the forgoing, the scene description of the 3D virtual environment of FIGS. 3A-3D may correspond to the scene description of FIG. 2A that includes definitions for the layers 202 and 204 and one or more additional layers. One or more additional layers, not indicated in FIG. 2A, may include additional at least portions of asset definitions for additional assets, such as an asset 304 corresponding to the ground, and other environmental assets represented in the display 300C. For the display 300D and/or the display 300B, a portion of scene description corresponding to the layer(s) may be unavailable and/or inactive, and therefore the corresponding properties and values may not be represented in the display 300D and/or the display 300B. For the display 300A, scene description for all layers associated with the 3D virtual environment may be active. In some examples, any combination of the displays 300A, 300B, 300C, or 300D may correspond to a video stream from a renderer 414 of the content management system 104 as described with respect to FIGS. 4A and 4B, or may correspond to frames rendered at least partially by a corresponding client 106.

Using containing assets, nested assets, instantiated assets, source assets, referencing assets, incorporated assets and/or overrides in scene description may enable the content management system 104 to provide rich descriptions of complex scenes capable of supporting the fidelity and features required by modern content authoring tools. For example, a single representation of a 3D virtual environment may be provided that can capture all of the various scene information that may be consumable by any of the various client(s) 106, even where individual client(s) 106 are only capable of consuming a particular subset and/or format of that information. Rich ways of communicating data between the client(s) 106 may be provided, such as by enabling non-destructive editing of data by the client(s) 106 (e.g., through overrides and activation/deactivation of content items), and enabling edits to assets to propagate to other assets via scene description hierarchies and references. Additionally, the representation of the assets may be compact in memory at the data store 114 by allowing for reuse of the underlying data.

However, such a rich representation of 3D virtual environments can impose significant limitations on network bandwidth and computations needed to resolve properties and values. For example, conventional software and systems that support rich representations of 3D virtual environments—such as USD—were developed and designed for offline development of 3D films for non-interactive entertainment. Content authors conventionally take turns individually developing aspects of content, which when complete may be merged by manually transferring and combining large files that include portions of scene description. Finally, the composite scene description may be run through a pipeline to resolve properties and values and render the 3D content into a video for viewing.

In this context, collaborative editing, interaction, and/or viewing of dynamic 3D virtual environments across devices and systems has not previously been possible, nor contemplated, for rich representations of 3D virtual environments. For example, the size of the data that is conventionally transferred when merging portions of a scene description is often prohibitively large enough to result in transfer times that make real-time or near-real time applications impossible or impractical. Additionally, the complexity in the scene description that is conventionally analyzed when resolving assets is often prohibitively high enough to result in processing times that further make real-time or near-real time applications impossible or impractical when combining portions of scene description to form a 3D virtual environment.

Publish and Subscribe Model and Incremental Updates to Content

In accordance with aspects of the disclosure, a publish/subscribe model may be operated by the data store manager 108 (one or more database servers) to provide one or more portions of scene description of a 3D virtual environment to the client(s) 106. Synchronization through the content management system 104 may be incremental with only changes to the scene description being published to subscribers. Incremental updates may allow real-time interoperation of content creation tools, renderers, augmented and virtual reality software and/or advanced simulation software of the client(s) 106 and/or within the content management system 104. In embodiments, clients may publish and subscribe to any piece of content (e.g., content item) for which they have suitable permissions. When multiple client(s) 106 publish and/or subscribe to the same or an overlapping set of content, a shared virtual environment may be provided with updates from any one of the client(s) 106 reflected to the others at interactive speeds.

Use cases include, but are not limited to: design reviews for product design and architecture; scene generation; scientific visualization (SciVis); automobile simulation (e.g., AutoSIM); cloud versions of games; virtual set production; and social VR or AR with user-generated content and elaborate worlds. For example, a graphics editor (e.g., Photoshop®) can be connected to the content management system 104 to add a texture to an object in a virtual scene, and a computer graphics application or animation tool (e.g., Autodesk Maya®) can be connected to the content management system 104 to animate that object (or a different object) in the virtual scene.

As described herein, a subscription to content may refer to a subscription to a portion of scene description that describes the content. Changes, or deltas, of the content may be with respect to that scene description portion. For example, data representative of content that is exchanged within the operating environment 100 may be in the form of scene description—such as via scene description language in a textual form, and/or via corresponding data structures and/or scene graph components—and/or in the form of difference data that may be used to reconstruct modified scene description portions from versions thereof.

Each client 106 and/or user may provide a request to the content management system 104 for a subscription to one or more identified assets of a 3D virtual environment and/or one or more identified portions thereof (e.g., "content" or "content items"). Based on the request, the content management system 104 may publish to the client 106 updates to the subscribed to content. A subscription by a client 106 to one or more assets and/or one or more portions thereof may serve as a request to at least be notified in the future that changes are available at the content management system 104 for the corresponding content. For example, a publication that is based on a subscription may include a notification that changes are available for the corresponding content and/or may include data representative of one or more portions of the corresponding content. Where a notification identifies that changes are available for the corresponding content, the client 106 may request data representative of the corresponding content and/or one or more portions of the corresponding content based on the notification. In response to that request, the client 106 may receive the requested data.

In general, in response to being provided a change to a content item, a client 106 and/or content manager 410 may make another change to that content item, and update the shared description to include the other change; make a change to another content item, and update the shared description to include the change to the other content item; use the content item including any change in some type of operation that does not cause another change to the content item; render the content item/asset; display the content item/asset; and/or update a graphical representation corresponding to the content item/asset.

In order to take any actions regarding changes to resolved properties and/or values of a scene description, the client 106 and/or content manager 410 (and similarly services 412 or renderers 414) may need to perform one or more portions of property and/or value resolution described herein to account for any changes made to the scene description. For example, a change to a portion of scene description of one content item may propagate to any number of other content items (e.g., in other layers) through the various relationships described herein, such as overrides, inheritance, references, instantiations, etc. This resolution may be different for different client(s) 106 (or services) depending upon which content items are active and/or available for property and value resolution at that client 106.

Using approaches described herein, when one or more client(s) 106 make changes to a portion of the scene description of the 3D virtual environment, other client(s) 106 may only receive content and/or notifications of the changes for portions of the scene description that are subscribed to by those client(s) 106. Thus, content of the scene description and changes thereto may be served on as needed or as desired basis, reducing the amount of data that needs to be transferred across the operating environment 100 for collaborative editing and/or other experiences for the client(s) 106 that may occur over the network 120. Also in some embodiments, rather than completely rerunning property and value resolution for scene description at the client 106, the content manager 410 may update the property and value resolution only with respect to the updated content item and/or changes to the content item. For example, differences may be identified and if those differences involve a relationship with another content item, and/or an override, corresponding updates may be made to property and value resolution data. However, unaffected properties and values may be retained and reused without having to resolve the entire local version of the scene graph.

In further aspects of the present disclosure, updates to content received from and/or provided to the client 106 may include the changes—or differences—between versions of a scene description portion(s) that corresponds to the content (e.g., requested and/or subscribed to content). For example, rather than transferring entire descriptions of assets and/or files of the 3D virtual environment to the content management system 104, each client 106 may determine data representative of differences between versions of content (e.g., describing added, deleted, and/or modified properties and/or values), and provide that data to the content management system 104. The difference data may be determined such that the data store manager 108 and/or other client(s) 106 are able to construct the updated version of the content (e.g., which may be based on edits made using the client 106) from the difference data. Thus, using disclosed approaches, rather than transferring entire copies of assets of the scene description when changes occur to the scene description, only information needed to effectuate those changes may be transferred, reducing the amount of data that needs to be transferred across the operating environment 100 for collaborative editing and/or other experiences for the client(s) 106 that may occur over the network 120.

Figure 4A:
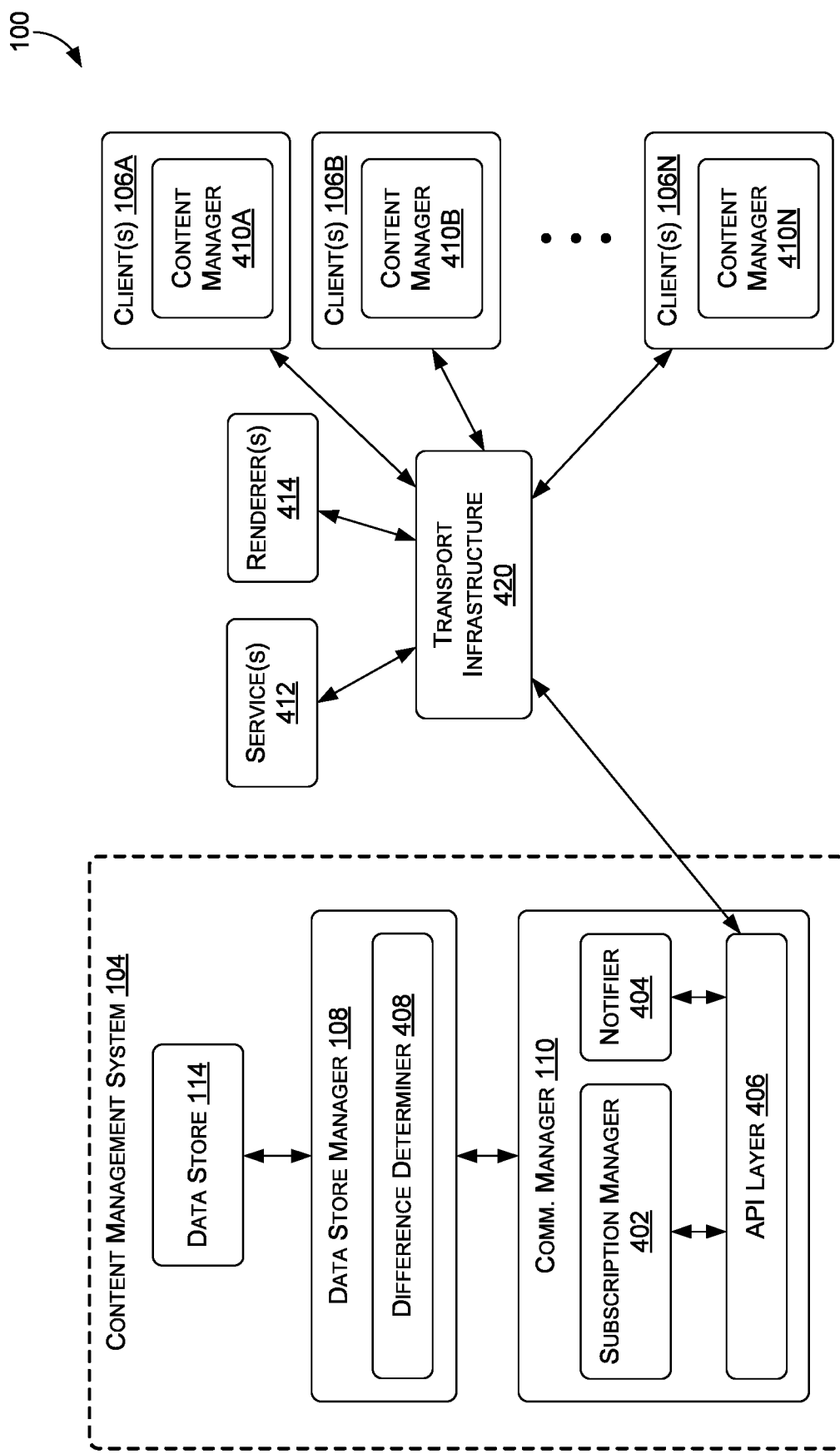
FIG. 4A shows a block diagram illustrating examples of components of an operating environment that implements a publish/subscribe model over transport infrastructure, in accordance with some embodiments of the present disclosure.

Referring now to FIG. 4A, FIG. 4A shows a block diagram illustrating examples of components of the operating environment 100 that implements a publish/subscribe model over a transport infrastructure 420, in accordance with some embodiments of the present disclosure. In FIG. 4A, the communications manager 110 of the content management system 104 includes a subscription manager 402, a notifier 404, and an API layer 406. The data store manager 108 of the content management system 104 includes a difference determiner 408. The content management system 104 may also include one or more services 412, which may include or refer to one or more microservices, and one or more renderers 414. In some embodiments one or more of the renders 414 and/or one or more of the services 412 may be a client 106. Thus, discussion of a client 106 may similarly apply to a renderer 414 and/or a service 412.

In at least one embodiment, the client(s) 106, the service(s) 412 and/or the renderer(s) 414 may each interface with the content management system 104 over the transport infrastructure 420 through the API layer 406 (e.g., comprising sockets such as Websockets). The transport infrastructure 420 may include any combination of the network 120 of FIG. 1 and/or inter-process communication of one or more server and/or client devices. For example, in some embodiments, the transport infrastructure 420 includes inter-process communication(s) of one or more of the client device 102A, the client device 102B, the client device 102, one or more of the server(s) 112, and/or one or more other server and/or client devices not shown.

In any example, the API layer 406, any other portion of the content management system 104, one or more of the clients 106, one or more of the services 412, and/or one or more of the renderers 414 may be implemented at least partially on one or more of those devices. The transport infrastructure 420 may vary depending upon these configurations. For example, a client device 102A could host the content management system 104 and the client 106A (and in some cases multiple clients 106). In such an example, a portion of the transport infrastructure 420 used by the local client 106A may include inter-process communication of the client device 102A. If a non-local client 106 is also included in the operating environment 100, another portion of the transport infrastructure 420 used by the non-local client 106 may include at least a portion of the network(s) 120.

Figure 4B:
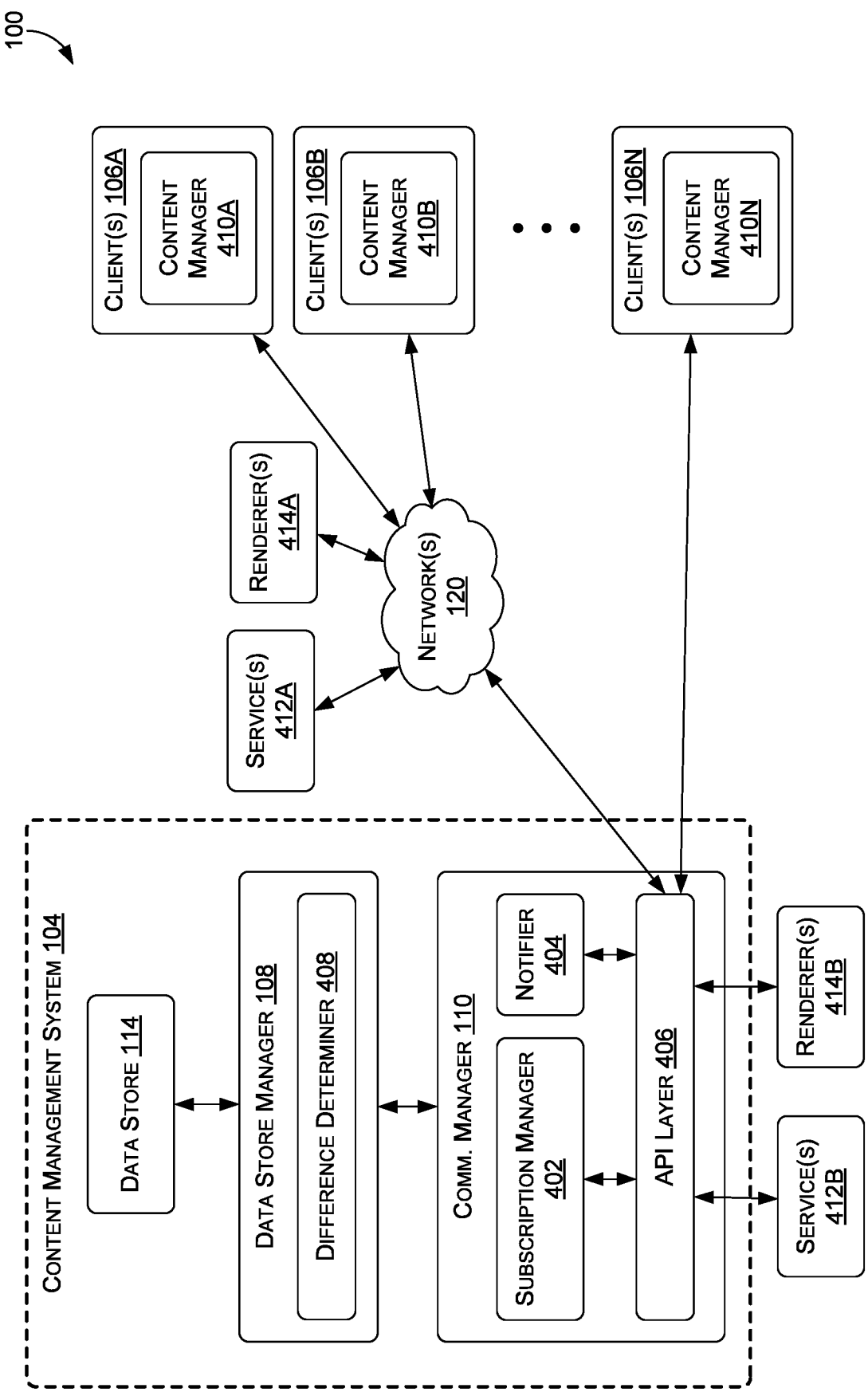
FIG. 4B shows a block diagram illustrating examples of components of an operating environment that implements a publish/subscribe model over transport infrastructure that includes a network(s), in accordance with some embodiments of the present disclosure.

As a further example, FIG. 4B shows a block diagram illustrating examples of components of an operating environment that implements a publish/subscribe model over rgw transport infrastructure 420 that includes the network(s) 120, in accordance with some embodiments of the present disclosure. In this example services 412A and services 412B may correspond to services 412 of FIG. 4A and renderers 414A and renderers 414B may correspond to renderers 414 of FIG. 4A. The services 412A and renderers 412A may be on one or more client and/or server devices and communicate with the content management system 104 over the network(s) 120. The services 412B and renderers 412B may share a client and/or server device with the content management system 104 and communicate with the content management system 104 over inter-process communication(s). Similarly, the client(s) 106A and the client(s) 106B may be on one or more client and/or server devices and communicate with the content management system 104 over the network(s) 120. The client(s) 106N may share a client and/or server device with the content management system 104 and communicate with the content management system 104 over inter-process communication(s).

The clients (or services or renderers) may use the API layer 406 to, for example, query and/or modify the data store 114, to subscribe to content of a 3D virtual environment, to unsubscribe from content of a 3D virtual environment, and/or to receive or provide updates to content of a 3D virtual environment or notifications thereof. The subscription manager 402 may be configured to manage the subscriptions of the client(s) 106 to the content. The notifier 404 may be configured to provide updates to content of a 3D virtual environment and/or notifications thereof to the client(s) 106 (e.g., using the subscription manager 402. The difference determiner 408 may be configured to determine differences between versions of content, such as between a current or base version(s) of the content and an updated version(s) of the content. In various embodiments, this may be similar to or different than operations performed by a content manager 410, and the notifier 404 may or may not forward those differences to any subscribing client(s) 106.

The services 412 may perform, for one or more 3D virtual environments, physics simulation, global illumination, ray-tracing, artificial intelligence operations, and/or other functions, which may include view-independent simulation or other functionality. In various examples, the services 412 may carry out any combination of these functions by operating on and/or updating the scene description(s) of the 3D virtual environment(s) using the data store manager 108. For example, properties and values may be analyzed and/or updated by one or more of the services 412 to effectuate physics operations, global illumination, ray-tracing effects, artificial intelligence, etc. Changes made by the services 412 may be to the scene description that is shared between the client(s) 106, and may or may not operate through the publish/subscribe model.

Each renderer 414 may perform, for one or more client(s) 106, one or more aspects of rendering a 3D virtual environment stored in the data store(s) 114. The rendered data may comprise, for example, frames of the 3D virtual environment, which may be streamed to a client 106 for viewing thereon. In various embodiments, a renderer 414 may perform cloud rendering for a client 106 that is a thin client, such as a mobile device. Where a client 106 is a VR client and/or an AR client, a renderer 414 may render a video stream (e.g., RGB-D) that is wider than the field-of-view of the camera, and may also transmit supplemental depth and hole-filling data from nearby viewpoints. During a period when the client 106 has stale data, the client 106 may reproject the stale data from the new viewpoint using the depth and hole-filling data to create appropriate parallax.

One or more of the renderers 414 and/or renderers integrated into a client 106 may exploit hardware-accelerated ray-tracing features of GPUs. Independent passes may be used for specular, diffuse, ambient occlusion, etc. In addition, interactive full path tracing may be supported for a more accurate result. A renderer may make use of multiple GPU's on a single node as well as multiple nodes working together. For multi-node rendering, each node may subscribe—via the subscription manager 402—to a same 3D virtual environment and/or content items thereof and render an appropriate tile. A control node may be used for timing and compositing the results. Synchronization among the nodes may be achieved using a message-passing service of the content management system 104.

In FIGS. 4A and 4B each of the client(s) 106 are shown as including a respective content manager 410. For example, the client 106A includes a content manager 410A, the client 106B includes a content manager 410B, and the client 106N includes a content manager 410N. The content managers 410A, 410B, and 410N are also referred to herein as "content managers 410." While each of the client(s) 106 are shown as including a content manager 410, in some examples one or more of the client(s) 106 may not include a content manager 410. For example, where a client 106 is a thin client (and/or is a client that does not locally process description data) the client 106 may not include a content manager 410. As further examples, different content managers 410 may include different subsets or combination of functionality described herein.

The subscription manager 402 may be configured to manage subscriptions of the client(s) 106 to the content of one or more 3D virtual environments. To subscribe to one or more content items, a client 106 may provide a request (e.g., API call) to the communications manager 110 of the content management system 104 that identifies the content (e.g., via the API layer 406). For example, the client 106 may provide an identifier of each item of content to request a subscription(s) to that content.

In some embodiments, a subscription to a content item (e.g., a layer or other asset type) by a client 106 may correspond to a subscription to particular files and/or resources of scene description (e.g., particular scene description portions) of a 3D virtual environment in the data store 114. For example, an identifier of content may comprise a file identifier and/or a file path of the files or resources. In some examples, content items and/or resources thereof may be identified within the operating environment 100 using a URI which may be in the form of a text string—such as a Uniform Resource Locator (URL)—which may also be referred to as a web address. Another example includes a Uniform Resource Name (URN).

Communication between the client(s) 106 and the content management system 104 may use a protocol encoded in JavaScript Object Notation (JSON) format, but other suitable formats may be used. Commands (e.g., to the API layer 406) may be supported for a client 106 to authenticate, create a file and/or asset, upload the contents of a file and/or asset, read a file and/or asset, receive a list of the contents of directories and/or assets (or resources or content items), and change permissions on files, resources, and/or content items (including locking and unlocking for writing). The communications manager 110 of the content management system 104 may also support commands to implement a message-passing mechanism for any additional communication desired among connected client(s) 106 and/or the services 412.

In at least one embodiment, a request to read a content item may serve as a subscription request for the content item. For example, when reading a file and/or resource (e.g., scene description portion), there may be an option for a client 106 to subscribe to future changes. In response to the request by the client 106, the subscription manager 402 may register a subscription(s) to the identified content and the data store manager 108 may provide the content to the client 106. After the content is provided to the client 106, the client 106 may receive all updates published to the content in the form of deltas. In some cases, providing the content to the client 106 may include providing all of the scene description of the identified content. In other examples, providing the content may include synchronizing data between the client 106 and the data store manager 108 that is representative of one or more portions of the description of the content. Synchronization may be used where the client 106 already includes data corresponding to the content (e.g., in a local cache), such as an older version of the content and/or a portion of the content (e.g., from a prior session). In such examples, the difference determiner 408 may be used to determine what portions of the content to send to the client 106 and/or difference data between client and server versions of one or more content items. In any example, the response to the read request may provide the client 106 with a contemporary or latest version of the content being shared amongst client(s) 106.

A non-limiting example of a request for a subscription may comprise: {'command': 'read,' 'uri': '/project/asset.usdc', 'etag': −1 'id': 12}. In this example, an identifier of the content may comprise the URI value '/project/asset.usdc.' An identifier of the request may comprise the id value of 12. Further, the etag value of −1 may indicate a latest version of the content available for collaboration amongst the client(s) 106. In other examples, the etag value may serve as a unique version identifier of the content (e.g., for other message types). A non-limiting example of a response to the request for the subscription may comprise: {'status': 'LATEST,' 'id': 12}+<asset content>. In this example, <asset content> may be data representative of one or more portions of the requested content (e.g., scene description and/or difference data). Other requests and responses may follow a similar format.

A client 106 may create, delete, and/or modify content of the 3D virtual environment. Updating a file and/or resource may be done incrementally by the client 106 supplying a delta or difference for the content. This may, for example, occur with respect to a local copy or version of the content. For example, where the client 106 received one or more items of content from the content management system 104 (e.g., in association with one or more subscriptions), the content manager 410 at the client 106 may track such edits made to the content (e.g., scene description portion). Examples of changes include adding any element to, deleting any element from, and/or modifying any element of scene description, such as properties and/or values therein. For example, an edit may change a value of a property in content, add a new property and/or value to content, etc. Such edits may create, delete, or modify containing assets, nested assets, instantiated assets, source assets, referencing assets, incorporated assets, overrides, and/or definitions of such relationships used to collectively define properties and corresponding values of the 3D virtual environment. For example, a user may add or change an override value to a property in a layer and/or other asset definition, and that change may propagate in property value resolution to any impacted assets (e.g., by overriding a value in another asset or layer even where the client 106 is not subscribed to that other content).

The content manager 410 of the client 106 may track all changes that a client 106 makes to a given content item and/or resource. For example, the content manager 410 may track multiple edit operations performed by a user and/or in software using the client 106. Based on the changes, the content manager 410 may construct a message(s) to send to the content management system 104 that includes data representative of the changes. In various examples, the content manager 410 determines differences between a version of the content item(s) received from the content management system 104, and a version of the content item(s) that includes the edits or changes (e.g., a list of the changes with timestamps). Data representative of these differences may be included in the message(s) rather than the entire content item(s).

In some examples, the difference data may represent one or more property-values pairs of an updated version of an asset procedurally, such as using one or more commands that may be performed on a version of the asset(s), such as a create command, a delete command, a modify command, a rename command, and/or a re-parent command with respect to one or more property-values pairs of the scene description (e.g., one or more structural elements and/or non-structural elements) that may be executed in sequence to construct the updated version of the asset(s). The difference data may also represent and/or indicate a sequence in which the commands are to be executed (e.g., via timestamps or listing them in sequence). In various examples, one or more of the commands may be the same commands executed by the client 106 that is being monitored and/or a user of a client device. Also, the sequence correspond to and/or be the same sequence in which commands were executed by the client 106 and/or entered by a user of a client device.

Additionally or alternatively, the difference data may represent one or more property-values pairs of the updated version of the asset declaratively, such as using updated property-value pairs, new property-value pairs, and/or deleted property-value pairs between the version and the updated version. In various examples one or more property-values pairs of the updated version may be defined procedurally with respect to the previous version of the asset, whereas one or more other property-values pairs of the updated version may be defined declaratively. As an example, structural elements of a scene graph (e.g., defining nodes and/or relationships between nodes) may be represented procedurally, whereas non-structural elements of the scene graph (e.g., defining fields and values) may be represented declaratively.

For example, on demand, the content manager 410 may construct a delta (diff) file for each content item (e.g., layer) that describes any changes made since the corresponding local representation was last synchronized with an external representation. In examples, a user may drag an object, creating a sequence of changes to the position values of the object. The content manager 410 may only send messages to the content management server 104 to reflect some of the states of the content—or may send all of the changes. In either case, the messages may be sent periodically or as available, such as to achieve a predetermined frame or update rate (e.g., about every 30 milliseconds for 30 frames per second) for content updates to the client(s) 106 (a single message may in some embodiments describe multiple states or versions of changes to content). The content manager 410 of a client 106 may generate, transmit, and apply delta files to and from an external source (e.g., the content management system 104), such as to bring a local representation(s) of content into correspondence with a remote and shared representation(s).

A message from a client 106 to the content management system 104 that edits or modifies a content item (e.g., a layer) may identify as an update command. Responses from the content management system 104 to an update command or a read command from a client 106 may include a unique version identifier (e.g., an etag value). Deltas, or differences, determined by the content manager 410 of the client 106 may be relative to a specific version identifier (which may be included in an update message). If a delta arrives at the content management system 104 and it is relative to a version identifier which is no longer current, the content management server 104 may reject the update. This may be considered an error condition, and in order for a client 106 to recover from this error condition, the client 106 may update an internal representation of the content item(s) to a most current version (e.g., through synchronization) or may receive the most current version. The content manager 410 may then construct a new delta(s) relative to that latest version (e.g., etag). An update command may then be provided that include the differences relative to the latest version.

In at least one embodiment, in order to avoid the possibility of race conditions with other processes trying to update the same content item, a client 106 may request a lock on content (e.g., an asset and/or corresponding file or resource) using a lock command. While holding a lock, a client 106 may stream updates to the content management system 104 without having to wait for any acknowledgment. The lock may, in some embodiments, serve as a guarantee that no other process could have modified the content in between the updates. A client 106 may also unlock the content using an unlock command. In some examples, conflicting updates from different client(s) 106 may be accepted and resolved by the data store manager 108.

When the communications manager 110 of the content management system 104 receives an incremental update for a client 106, it may, using the subscription manager 402, directly forward the update (e.g., the message and/or difference data) to all other client(s) 106 (and in some embodiments the services 412 or renderers 414) subscribed to the corresponding content. Using this approach, update messages do not need to be modified before distribution. This may reduce latency and allow the content management system 104 to support a large numbers of client(s) 106 and with fast update rates.

The data store manager 108 may keep track of all updates to each content item (e.g., file or resource) in a list. The difference determiner 408 may periodically coalesce a base or original version of the content and a series of delta updates from one or more client(s) 106 into a new version of the content. For example, the difference determiner 408 may use the data from the client(s) 106 to locally reconstruct one or more versions of the content item(s). Differences to a same content item(s) may be received from multiple client(s) 106 and may be combined with a previous shared version of the content item(s) at the content management system 104 to determine and/or create a new version of the content item(s) (e.g., a shared version). If a client 106 performs a read on content that has not yet been coalesced, it may receive a base version of the content and a series of deltas (created by one or more of the services 412 and/or client(s) 106) that the client 106 can apply to the base content to reconstruct the latest version. The difference determiner 408 may run at lower priority than the process of the data store manager 108 that tracks updates to the content—using spare cycles to coalesce when it can.

In various examples, creating a new version of the content item(s) may include coalescing a history of differences, or changes, made to the content item(s). The coalesced data may be stored in a file and/or resource representative of the version of the content item(s) and/or the 3D virtual environment. However, determining a new version of the content item(s) and/or the 3D virtual environment may not necessarily include coalescing the history of differences. For example, in some embodiment, particular versions of content items and/or properties or values thereof (e.g., a latest shared version) may be derived or identified by the difference determiner 408 from an analysis of the difference data (e.g., relative to a particular version of the content).

Coalescing the history of differences (e.g., using corresponding timestamps) may occur periodically and be used to persistently store and access versions of content, as well as to reduce storage size. Difference data may be discarded in order to conserve storage space. In some embodiments, one or more of the client(s) 106 may request (e.g., at the direction of a user or algorithm) that a version of the 3D virtual environment and/or one or more particular content items be persistently stored on the content management system 104.

In at least one embodiment, the functionality of the content mangers 410 may be built into a plug-in for one or more of the client(s) 106. However, one or more aspects of the functionality of a content manager 410 may also be integrated, at least partially, natively into one or more of the client(s) 106 and/or a host operating system or service, or other local or cloud-based software that may be external to the client 106. Implementing a content manager 410 at least partially as a plug-in to a client 106 is one suitable to integrating a wide variety of game engines, 3D modeling and animation packages, paint programs and AR/VR libraries into the operating environment 100 without necessarily having to modify the native code. For example, these plug-ins may be used to allow the software to inter-operate with each other using live updates passed back and forth through the content management system 104, which acts as a hub.

Figure 5:
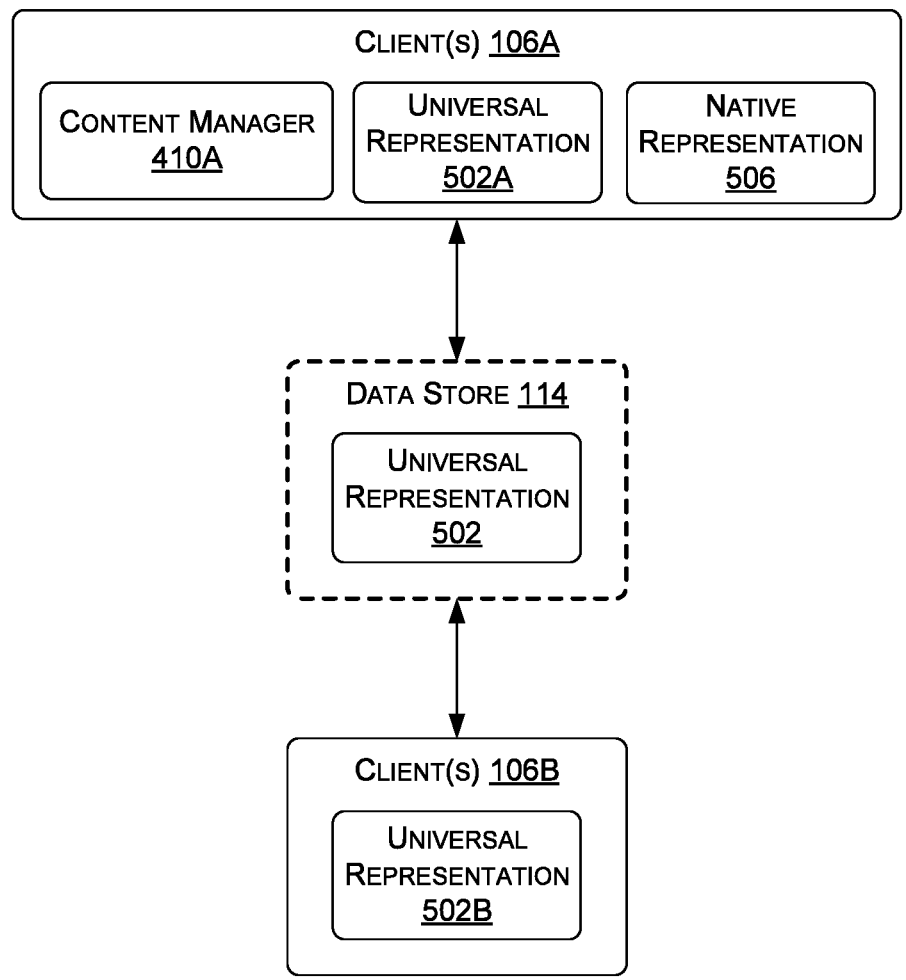
FIG. 5 is a block diagram illustrating an example of a flow of information between a content management system and clients, in accordance with some embodiments of the present disclosure.

In various examples, a content manager 410 may enable a legacy content creation tool that was not specifically developed for use with the shared scene description format, the APIs, and/or the content management system 104. An example is described with respect to FIG. 5, which is a block diagram illustrating an example of a flow of information between a content management system and clients, in accordance with some embodiments of the present disclosure.

In examples, the content manager 410A that is associated with the client 106A may establish a mirrored relationship between a universal representation 502A at the client 106A and a corresponding universal representation 502 in the data store 114 of the content management system 104 (e.g., so that the content they represent is synchronized). In embodiments where the universal representation 502 is incompatible with the client 106A, the content manager 410A may additionally synchronize a native representation 506 that is useable by the client 106A. For example, the native representation 506 may be a native internal representation of the client 106A with the universal representation 502A comprising a corresponding description format or scene description language that may be shared amongst other client(s) 106 and/or the content management system 104 (e.g., USD scene description). The content manager 410B associated with the client 106B may also establish a mirrored relationship between a universal representation 502B at the client 106B and the corresponding universal representation 502 in the data store 114 of the content management system 104. In this example, the client 106B may be capable of natively using the universal representation 502B.

Figure 3A:
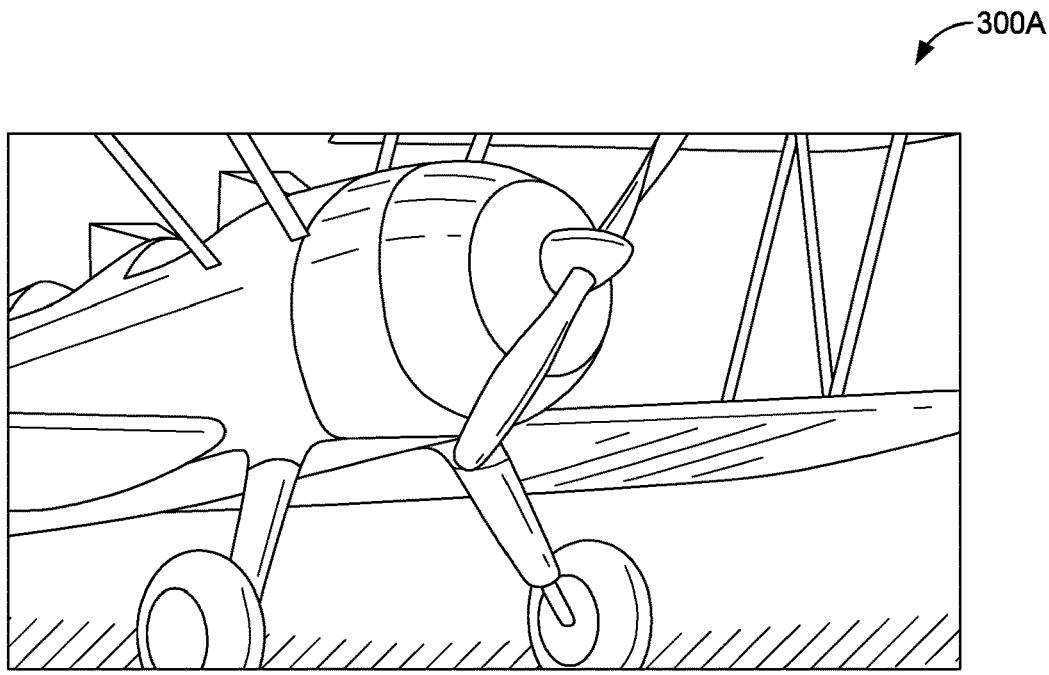
FIG. 3A illustrates an example of a display of a graphical representation of a 3D virtual environment represented using a scene description, in accordance with some embodiments of the present disclosure.
Figure 3B:
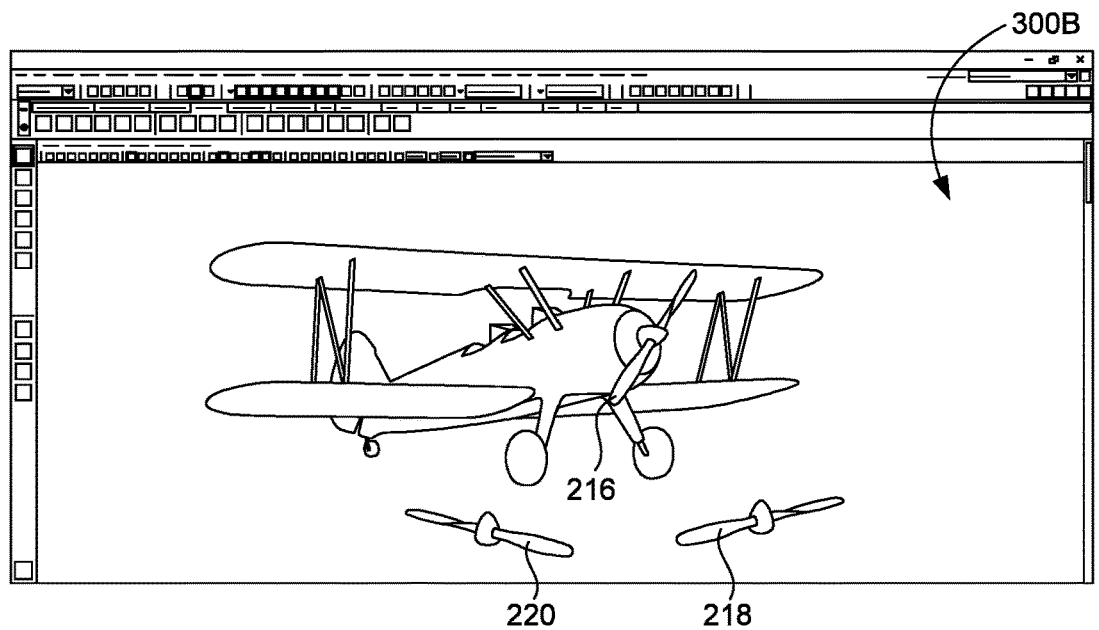
FIG. 3B illustrates an example of a display in an animation editor of a graphical representation of a 3D virtual environment represented using the scene description of FIG. 3A, in accordance with some embodiments of the present disclosure.
Figure 3C:
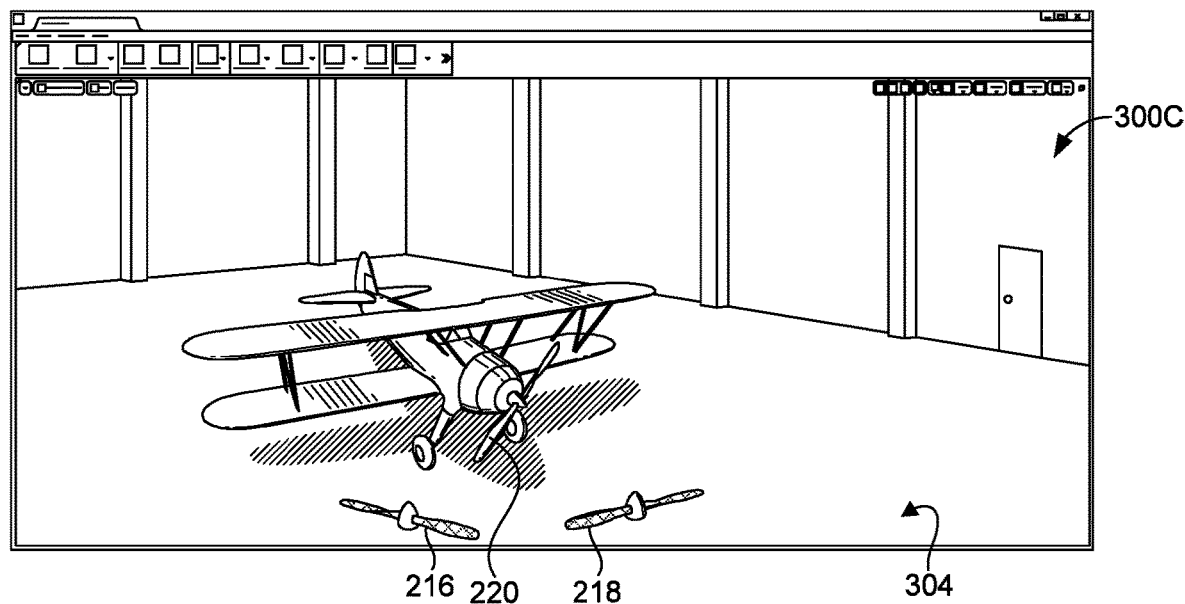
FIG. 3C illustrates an example of a display in in a game engine editor of a graphical representation of a 3D virtual environment represented using the scene description of FIG. 3A, in accordance with some embodiments of the present disclosure.
Figure 3D:
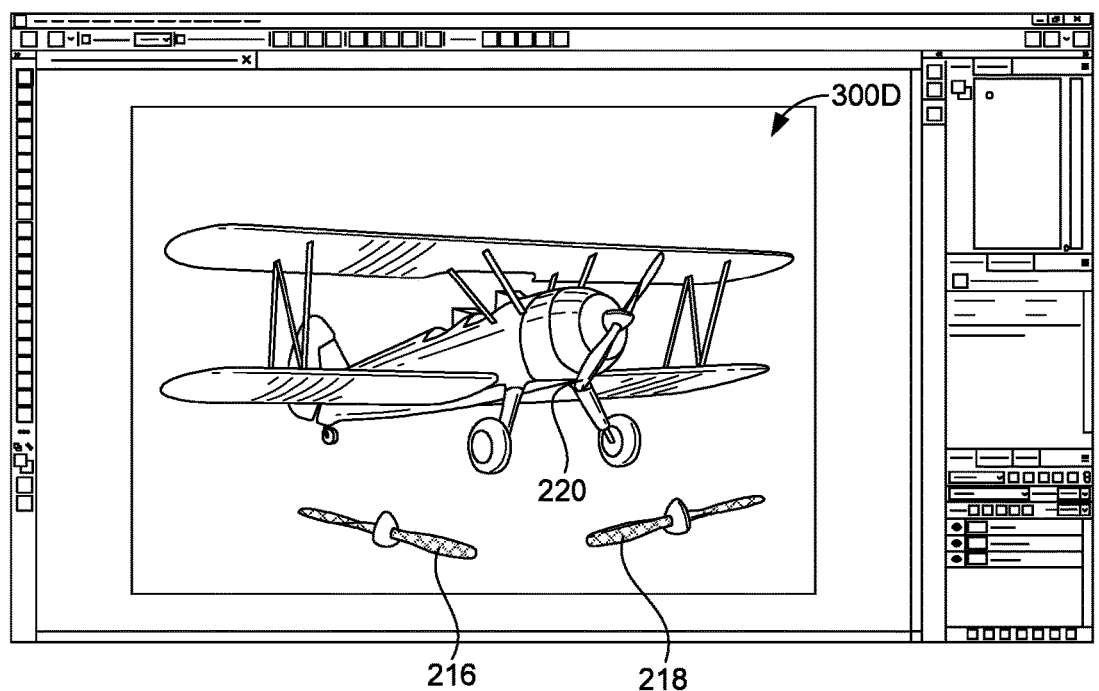
FIG. 3D illustrates an example of a display in a raster graphics editor of a graphical representation of a 3D virtual environment represented using the scene description of FIG. 3A, in accordance with some embodiments of the present disclosure.

For this example, assume the display 300B of FIG. 3B corresponds to the client 106B and the display 300C of FIG. 3C or 300D of FIG. 3D corresponds to the client 106A. If a user performs an operation to change the scene description at the client 106B that corresponds to the display 300B, the content manager 410B may make a corresponding modification to the local shared universal representation 502B. If live updating is enabled, the content manager 410B may publish the delta(s) to the content management server 104 (e.g., through the API layer 406). If the subscription manager 402 determines the client 106A is subscribed to the same content, the content manager 410A may receive the delta. The content manager 410A may make the corresponding change to the local version of the shared universal representation 502A, and mirror or propagate that change to the native representation 506 of the client 106A. As a result, users of the client(s) 106A and 106B may both see the scene update live with respect to the displays 300B and 300C or 300D based on the changes made by the user of the client 106B. In embodiments, the content managers 410 may receive and/or display updates from other users and/or the services 412 as they happen, at a predetermined interval or rate, and/or as desired or specified.

While this particular example may involve different users on different client devices 106, in other examples, one or more of the client(s) 106 may be used on a same machine. In this way, a user may use each client 106 according to its capabilities, strengths, and/or the user's preferences. Where multiple client(s) 106 operate on a common client device within the operating environment 100, the client(s) 106 may in some embodiments operate on a common representation of content that is compatible with the content management system 104 (e.g., the universal representation 502A), rather than each retaining and managing separate copies. Similar concepts may be applied across machines on local networks, etc. Various embodiments are contemplated, such as where a content manager 410 acts as a master for managing communications of multiple client(s) 106 with the content management system 104 (or managing native representations), or where each content manager 410 communicates with the content management system 104 and with other content managers 410.

Additionally, one or more users of the client(s) 106 may not actively participate in content authoring or may not participate in a conventional sense. In examples where a client 106 is an AR client or a VR client, the client 106 and/or an associated client device 102 may determine a camera transform based on an orientation of the client device 102 and publish (e.g., by a content manager 410) a description of a camera with that transform to the shared description of a 3D virtual environment managed by the content management system 104. In an example use case, another client 106 (e.g., on a desktop computer or device with a fully-featured GPU) and/or a renderer 414 may subscribe to the camera and render the scene viewable by the camera or otherwise based on that subscribed to content. The resulting render may then be streamed (e.g., over a local WiFi network) to the AR or VR client 106 and displayed on the client device 102 (and/or to one or more other client(s) 106). Using approaches described herein, any number of users using any number of devices or client(s) 106 may simultaneously view a shared virtual world with mobile or other low powered devices, without being limited by the restricted rendering power on any individual device.

Similar to the camera example, for VR applications, an avatar may be posed based on the position of the VR headset and/or controllers. The content management system 104 and the content managers 410 may provide bidirectional replication so that the VR user's avatar and/or view is reflected to all subscribers, AR, VR and non-AR or VR (e.g., across heterogeneous client(s) 106). Further, disclosed embodiments enable tools developed for particular client(s) 106 (e.g., procedural tools) to operate as agents or services that impact the shared 3D virtual environment with changes that are reflected on unsupported clients. As an example, a game engine may include a visual scripting tool. Once a client 106 that supports the tool is subscribed to the shared 3D virtual environment, the service may be provided to all connected client(s) 106 that are subscribed to impacted content. The visual scripting tool may, for example, be triggered when a particular object enters a given bounding box or satisfies some other condition. That condition(s) may be satisfied by changes to the shared 3D virtual environment caused by a different client 106 than the client 106 hosting the tool. For example, a user or algorithm of the other client 106 may move the object into that bounding box, the movement may be published to the content management system 104, and may be broadcast to the client 106 that hosts the tool, thereby triggering a script. The tool may thus make changes to the scene, publish them to the content management system 104, and the effects may appear at interactive speeds to all subscribing client(s) 106. It may therefore appear that the execution engine of the tool is natively integrated into each subscribing client 106.

A further example of tool that may become an agent or service is a constraint satisfaction tool. A constraint satisfaction tool may provide a constraint engine that understands and enforces relationships among doors, windows, walls, and/or other objects. If a client 106 comprising the tool is subscribed to a shared 3D virtual environment, constraint satisfaction may be provided for all subscribed client(s) 106. If one client 106 moves a wall, the client 106 comprising the tool may recognize any constraint violations and may make and publish resultant changes to the placement of the windows, doors, and/or other objects, as examples.

While the scene description used by the content management system 104 may support a high level of generality, this may introduce challenges to the performance of updates across the client(s) 106. For example, a change to content may impact other content through containing assets, nested assets, instantiated assets, source assets, referencing assets, incorporated assets, and/or overrides. Thus, property and value resolution may impose a significant burden on this process. In accordance with embodiments of the present disclosure, a content manager 410 of a client 106 (and/or the content management system 104) may mark or designate one or more content items (e.g., a layer, an asset, a property, a file, a resource) for fast-updates. Such a designation from a client 106 may serve as a promise that the content item(s) will not include changes that impact one or more aspects of property value resolution and/or may restrict the content item(s) from including such changes. A similar designation may be made by the data store manager 108 by determining one or more updates meets these criteria (e.g., an update is only to one or more existing property values).

In embodiments, such restricted changes may include structural changes to the scene description of a 3D virtual environment (e.g., to hierarchical relationships between assets), examples of which may include creating or deleting primitives or relationships in the content item(s). Other requirements may be that the content item (e.g., layer) is the most powerful (e.g., highest priority) for defining those properties in property value resolution, and/or that the content item(s) contains only values for a fixed set of properties of fixed types. By restricting the changes and/or characteristics of one or more content items, property value resolution may be avoided and/or simplified in propagating changes to the content items across the operating environment 100. For example, values of properties may be directly updated using pre-allocated storage. This approach may be useful in various scenarios, such as for physics simulation where transforms may be updated from a specialized physics application or service (e.g., the service 412 and/or a content manager 410).

Lazy Loading

In at least one embodiment, a portion of scene description for a content item that is received by the client(s) 106 (e.g., a subscribed to content item) may include references to one or more other portions of scene description for incorporation into the content item (in addition to properties and values of the content item). These referenced portions may correspond to other content items and may be referred to as payloads. A payload may be an incorporated asset, as described herein, but in some embodiments not all incorporated assets may be payloads. For example, a payload may be a type of incorporated asset and in some examples may be defined or specified as a payload in the scene description. In embodiments, the content manager 410 of a client 106 may analyze a received scene description portion of a content item, identify one or more references to payloads, and determine whether or not to request the corresponding portion(s) of content from the content management system 104 using the reference(s). For example, the content manager 410 may determine whether to read and/or subscribe to the referenced content, which itself may include additional references. This may be used, for example, to reduce bandwidth requirements by reducing the amount of data transferred to the client 106, to manage the memory footprint of a scene so that it does not become too large at the client 106, and/or to load only the representations that are necessary for a desired display and/or use of the content. In some embodiments, other types of incorporated assets that are not payloads may be automatically provided to the client 106 due to being referred to in a subscribed to referencing asset, or may be automatically requested and/or subscribed to by the client 106 when the client 106 identifies the reference in content of the referencing asset.

In some cases, the content item may include metadata for one or more of the references and the content manager 410 may analyze the metadata to determine whether or not to request or subscribe to the additional content. Examples of metadata include a location for the payload (e.g., a corresponding object) in the 3D virtual environment, a type of data (e.g., content item and/or asset) included in the payload, a storage size of the payload or a size of object within the 3D virtual environment, a Level-of-Detail associated with the payload, a variant of a scene element or object associated with the payload, etc. Metadata may in some examples comprise properties and/or values in the description of the content item that are associated with the payload.

As an example, a reference may correspond to a 3D object of a 3D virtual environment rendered on the display 300C of FIG. 3C. A content manager 410 may analyze a bounding box corresponding to the display 300C to determine whether the 3D object is visible to the camera. When the 3D object is outside of the bounding box, the content manager 410 may determine not to request that payload from the content management system 104. Additionally or alternatively, the content manager 410 may determine that the 3D object is far enough away from the camera in the virtual environment that it does not need to be loaded and/or displayed. As a further example, the metadata of the payload may identify the type of content included in the payload, and the content manager 410 may determine the client 106 is not capable of or interested in displaying that type of content. Using this approach, portions of content items may be received and loaded by the client(s) 106 on demand. For example, this approach may be used not only for the initial versions of content received by the client(s) 106, but also for updates to the content items. As an example, a content manager 410 may determine not to request updates for certain payloads.

Meta-Network Implementations

Figure 6:
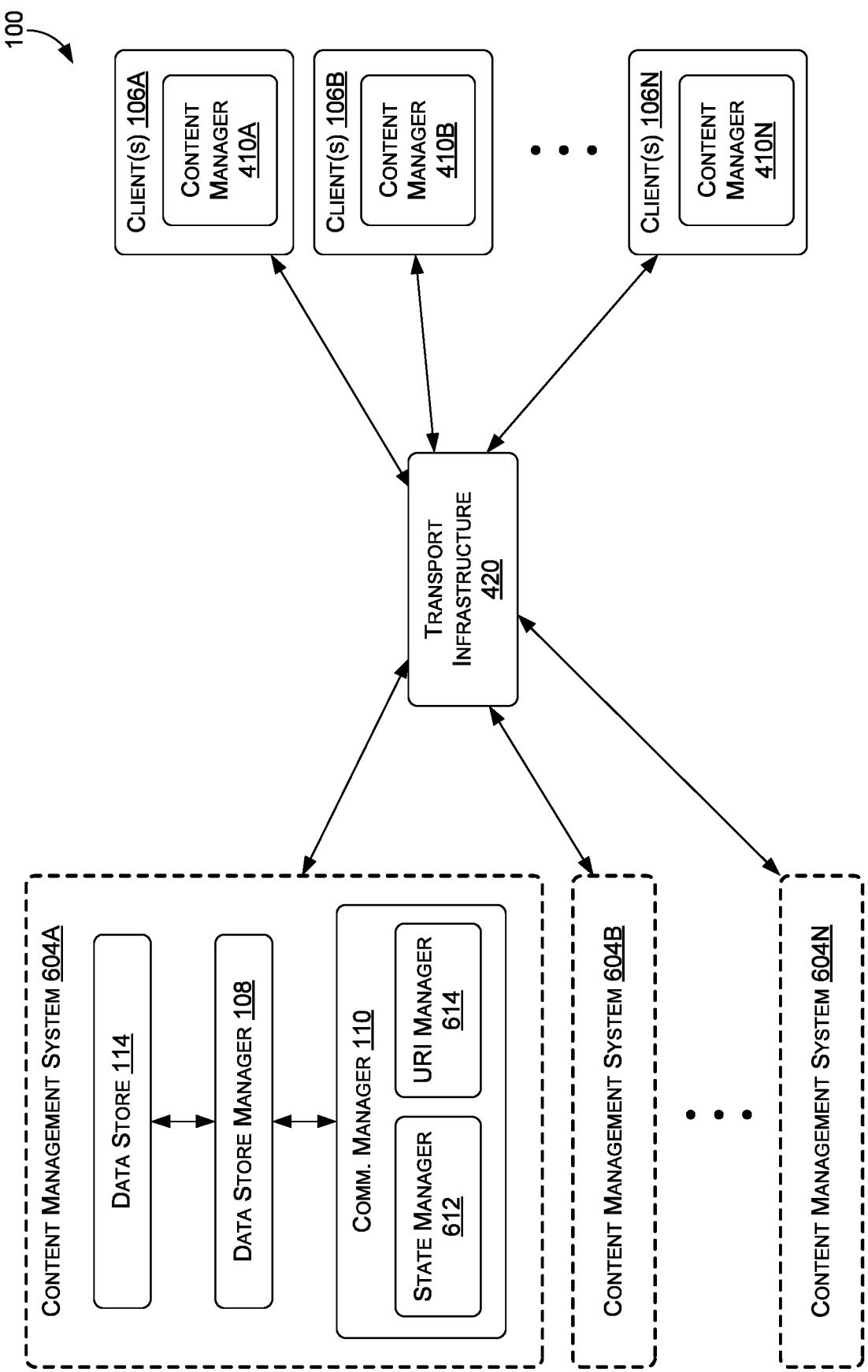
FIG. 6 is diagram illustrating an example of an operating environment including multiple content management systems, in accordance with some embodiments of the present disclosure.

Referring now to FIG. 6, FIG. 6 is diagram illustrating an example of an operating environment including multiple content management systems, in accordance with some embodiments of the present disclosure. In the example of FIG. 6, the operating environment 100 includes any number of content management systems 604A and 604B through 604N (also referred to as "content management systems"). One or more of the content management systems 604 may correspond to the content management system 104. In examples, one or more of the content management systems 604 may be different from one another in or more respects, such as by only allowing for scene description portions of 3D virtual environments to be read by the client(s) 106.

As shown in FIG. 6, one or more of the content management systems 604 may include a state manager 612, and/or a URI manager 614, as shown in the content management system 604A. In some embodiments, using state managers 612, and/or URI managers 614, the content management systems 604 may operate as web-like services, such as to store, generate and serve up content to the client(s) 106.

Each client 106 may connect to a respective content management system 604 through a standard port which is managed by a communications manager 110. Each content item (e.g., file or resource) or portion thereof within the data store 114 may have an associated URI, such as a URL, within the operating environment 100. The client 106 may use the URI to reference the corresponding scene description portion in messages to the content management system 604 (e.g., in read requests, subscription requests, update requests, in other commands, etc.). The URI manager 614 may identify the portion of the scene description that corresponds to the URI and respond to messages from the client 106 accordingly, such as by including data representative of one or more portions of the requested content in a response, updating the corresponding content, etc. In at least one embodiment, the scene description that is provided to the client(s) 106 and maintained in the data store 114 may include the URIs in references for any accessible content item within 3D virtual environments (e.g., payloads, incorporated assets, etc.).

In various examples, the data representative of one or more portions of the requested content may be stored in a different content management system 604 and/or an external data store system than the system the received the request. The URI manager 614 may look up and retrieve a URI associated with that other content management system 604 and/or external data store system and provide the URI in the response. The client(s) 106 may then use that URI to retrieve the data representative of one or more portions of the requested content from the appropriate system. Thus, some client requested content may be stored by the system that receives the request, while other client requested content may be stored by a different system, where the client is provided with the means to retrieve that content (e.g., a URI). As a further example, the system that receives a request for content may retrieve that content from another system using the URI and provide the content to the client(s) 106 in the response. As an additional example, the system that receives a request for content may notify the other system of the request using the URI and that other system may provide the content to the client(s) 106 in the response.

Also in various examples, one or more of the content management systems 604 may use a content delivery network (CDN) that may implement a caching service. The caching service may intercept one or more requests and serve content to the client(s) 106 without necessarily querying backend server(s).

The URIs within a particular content item may correspond to content stored in any number of the content management systems 604 and/or other systems. A client 106 and/or a content manager 410 may use a name resolution system, such as a Domain Name System (DNS), to resolve the URI to an address—such as an Internet Protocol (IP) address—so that corresponding messages are routed over the network 120 to the appropriate content management system 604 and/or server.

In at least one embodiment, the URI manager 614 comprises a HyperText Markup Language (HTML) server and the URIs comprise URLs. The URLs may be within hyperlinks within a content item (e.g., a scene description file). A client 106 may trade a URL for the appropriate portion of content, similar to how an HTTP server allows a client to trade a URL for HTML. For example, a DNS server may be used to resolve the URL to the address of an appropriate content management system 604 that includes corresponding content.

In various implementations, unlike HTTP, the operating environment 100 implements a fundamentally incremental, difference-based protocol. As a result, each content management system 604 may include a state manager 612 to maintain state with client(s) 106 and/or web sessions. To do so, the state manager 612 may implement functionality of a Web Socket server, a REpresentational State Transfer (REST) Hooks server, a WebHooks server, a Pub-Sub server, or other state-based management solution. In embodiments, a bidirectional stateful-protocol may be used. For example, sessions between the client(s) 106 and the content management systems 604 may be implemented over persistent WebSocket connections. States that are maintained (e.g., logged and tracked) by the state manager 612 for connections to a content management system 604 may include those of authentication, as well as the set of subscriptions for the publish/subscribe model and their corresponding version identifiers (e.g., etags). The state manager 612 may be implemented across one or more servers 112 and may hand off and/or assign jobs or tasks to various servers and/or instances within a same or different content management system 604 (e.g., for load balancing purposes). This may include the state manager 612 passing any of the various state data associated with the job to those servers.

Approaches described herein may be used to enable a high performance and practical true 3D Internet. The traditional Internet is fundamentally two-dimensional (2D) and stateless. When something changes regarding a webpage, that page is completely reloaded. This works because 2D webpages are typically small in size and are not complicated in nature. However, a 3D virtual environment may be highly complex and large. Integrating such content into traditional Internet architectures for 2D webpages may result in prohibitively long load times for dynamic 3D content with large file transfers and processing times.

For decades, the computer graphics community has tried to integrate 3D content into conventional Internet architectures for 2D web pages. Early attempts included Virtual Reality Modeling Language (VRML) in 1994 and the Web3D consortium in 1997. More recent examples include Khronos Group standards like WebGL, WebVR and GL Transmission Format (glTF). After all of this time and concerted effort, 3D web technologies still suffer from minimal adoption. This may be due to the limited performance of these solutions along with low visual quality due in part to primitive representations of 3D content.

However, in accordance with disclosed embodiments, by using stateful connections to the content management systems 604, in combination with incremental updates to content, name resolution, and rich descriptions of 3D virtual environments, a high performance and practical foundation for a true 3D Internet may be realized. Additionally, in various embodiments, interactive experiences between users and clients may be facilitated across different systems and 3D virtual environments, and across different interaction engines that may facilitate user interactions with 3D content using vastly different and potentially incompatible rules and software. For example, content and interactions may be shared across game engines and 3D virtual environments, as well as other non-game oriented engines. A hyperlink in a scene description portion of a content item may reference an entire 3D virtual environment (e.g., a top level reference to all scene description of a 3D virtual environment), such as a USD stage and/or a scene graph, which may be hosted by a different content management system 604. The software may handle a link and/or the corresponding content based on the manner in which the link is specified in the scene description (e.g., via metadata, instructions, indicators, context, etc.).

As a further example, the link may refer to a content item or 3D virtual environment that is hosted by a different content management system 604 and embedded within another 3D virtual environment (e.g., for concurrent display and/or interoperability). Additionally, such links may be used by the client 106 and/or an external application or service to load one or more portions of a 3D virtual environment within the client 106. For example, a user may click on a link within content of a web browser, an email, a display of a file system, or within another application or service, and the software may in response cause the 3D content to be loaded and/or displayed within that software or another application or service.

Now referring to FIGS. 7-10, each block of methods 700, 800, 900, and 1000, and other methods described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, the methods are described, by way of example, with respect to the operating environment 100. However, these methods may additionally or alternatively be executed by any one system, or any combination of systems, including, but not limited to, those described herein.

Figure 7:
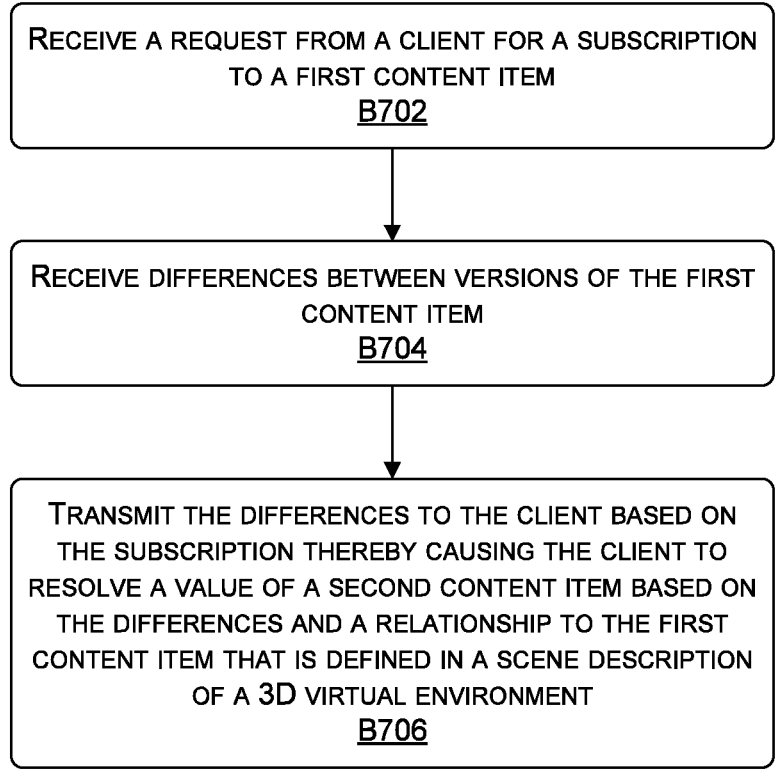
FIG. 7 is a flow diagram showing an example of a method for propagating to clients changes to content items that have relationships defined in a scene description of a 3D virtual environment, in accordance with some embodiments of the present disclosure.

FIG. 7 is a flow diagram showing the method 700 for propagating to clients changes to content items that have relationships defined in a scene description of a 3D virtual environment, in accordance with some embodiments of the present disclosure. The method 700, at block B702, includes receiving a request from a client for a subscription to a first content item. For example, the subscription manager 402 of the content management system 104 of FIG. 4 may receive a request from the client 106A for a subscription to a first content item, such as the layer 202 of FIG. 2.

The method 700, at block B704 includes receiving differences between versions of the first content item. For example, the client 106B or a service 412 of FIG. 4 may provide difference data regarding the first content item. The differences may reflect a change made to one or more portions of the layer 202. For example, the change may be to a value of the property-value pair 228.

The method 700, at block B706 includes transmitting the differences to the client based on the subscription thereby causing the client to resolve a value of a second content item based on the differences and a relationship to the first content item that is defined in a scene description of a 3D virtual environment. For example, the notifier 404 of the content management system 104 may transmit the differences to the client 106A based on the subscription. The client 106A may, for example, resolve a value of the property-value pair 236 based on the differences and an override specified for the corresponding property in the layer 204.

Figure 8:
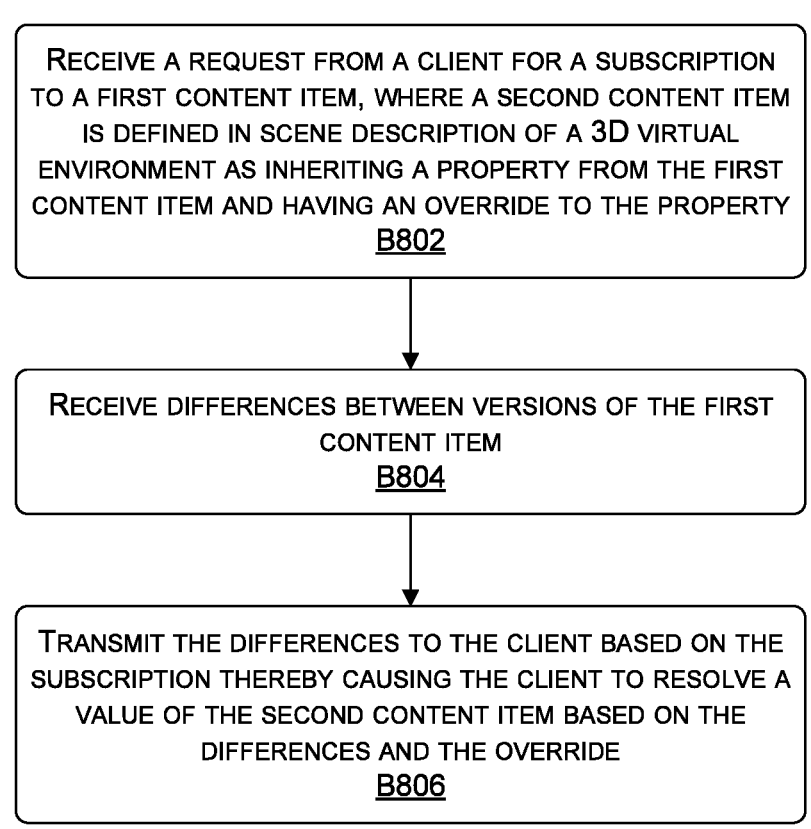
FIG. 8 is a flow diagram showing an example of a method for propagating to clients changes to content items using inheritance and overrides defined in a scene description of a 3D virtual environment, in accordance with some embodiments of the present disclosure.

FIG. 8 is a flow diagram showing the method 800 for propagating to clients changes to content items using inheritance and overrides defined in a scene description of a 3D virtual environment, in accordance with some embodiments of the present disclosure. The method 800, at block B802, includes receiving a request from a client for a subscription to a first content item, where a second content item is defined in scene description of a 3D virtual environment as inheriting a property from the first content item and having an override to the property.

For example, the subscription manager 402 of the content management system 104 of FIG. 4 may receive a request from the client 106A for a subscription to a first content item, such as the layer 202 of FIG. 2.

The method 800, at block B804 includes receiving differences between versions of the first content item. For example, the client 106B or a service 412 of FIG. 4 may provide difference data regarding the first content item. The differences may reflect a change made to one or more portions of the layer 202. For example, the change may be to a value of the property-value pair 228.

The method 800, at block B806 includes transmitting the differences to the client based on the subscription thereby causing the client to resolve a value of the second content item based on the differences and the override. For example, the notifier 404 of the content management system 104 may transmit the differences to the client 106A based on the subscription. The client 106A may, for example, resolve a value of the property-value pair 236 based on the differences and the override specified for the corresponding property in the layer 204.

Figure 9:
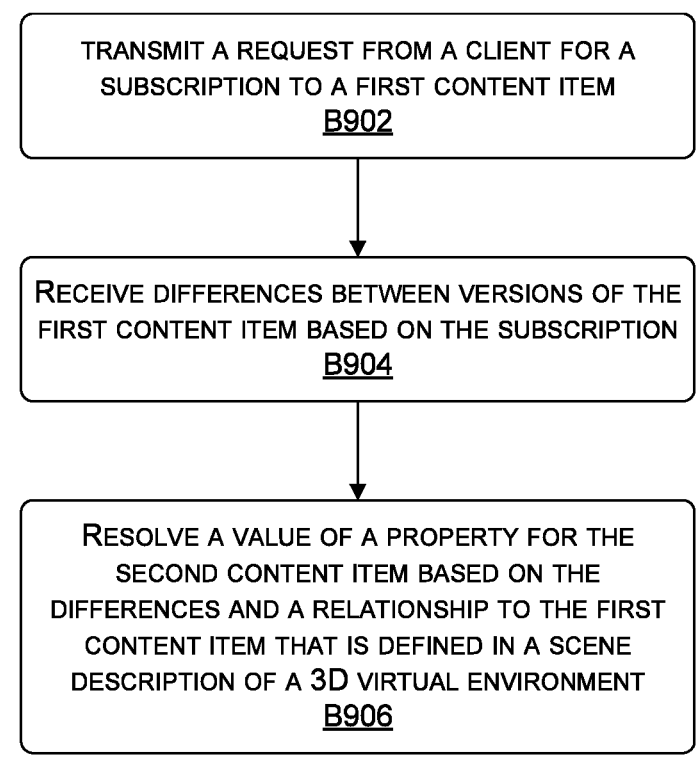
FIG. 9 is a flow diagram showing an example of a method for clients to share changes to content items that have relationships defined in a scene description of a 3D virtual environment, in accordance with some embodiments of the present disclosure.

FIG. 9 is a flow diagram showing the method 900 for clients to share changes to content items that have relationships defined in a scene description of a 3D virtual environment, in accordance with some embodiments of the present disclosure. The method 900, at block B902, includes transmitting a request from a client for a subscription to a first content item. For example, the content manager 410 of the client 106A of FIG. 4 may transmit a request from the client 106A for a subscription to a first content item, such as the layer 202 of FIG. 2.

The method 900, at block B904 includes receiving differences between versions of the first content item based on the subscription. For example, the client 106B or a service 412 of FIG. 4 may provide difference data regarding the first content item to the content management system 104. The differences may reflect a change made to one or more portions of the layer 202. For example, the change may be to a value of the property-value pair 228. The content manager 410 of the client 106A of FIG. 4 may then receive the differences from the content management system 104.

The method 900, at block B906 includes resolving a value of a property for a second content item based on the differences and a relationship to the first content item that is defined in a scene description of a 3D virtual environment. For example, the content manager 410 may resolve a value of the property-value pair 236 based on the differences and an override specified for the corresponding property in the layer 204.

Figure 10:
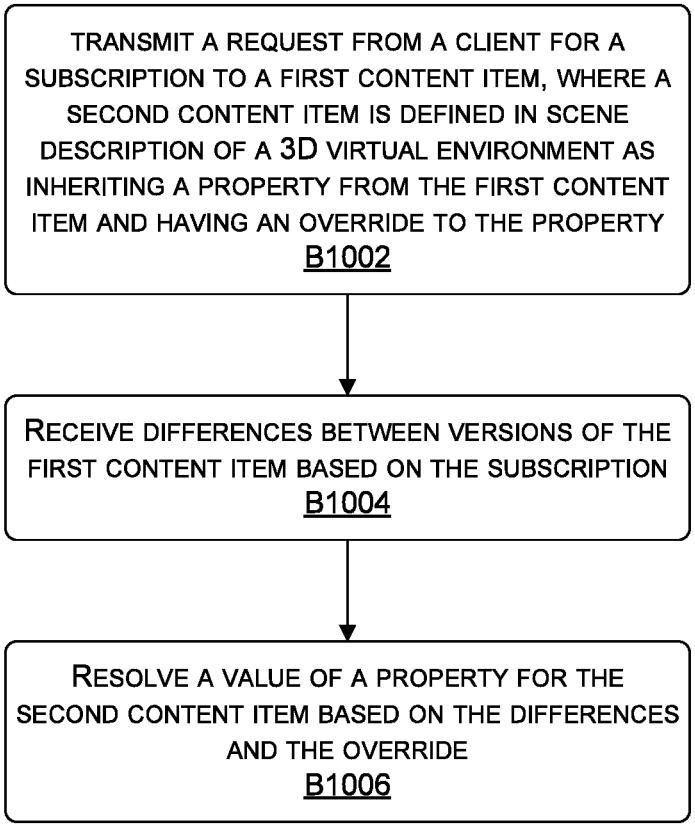
FIG. 10 is a flow diagram showing an example of a method for clients to share changes to content items using inheritance and overrides defined in a scene description of a 3D virtual environment, in accordance with some embodiments of the present disclosure.

FIG. 10 is a flow diagram showing the method 1000 for clients to share changes to content items using inheritance and overrides defined in a scene description of a 3D virtual environment, in accordance with some embodiments of the present disclosure. The method 1000, at block B1002, includes transmitting a request from a client for a subscription to a first content item, where a second content item is defined in a scene description of a 3D virtual environment as inheriting a property from the first content item and having an override to the property. For example, the content manager 410 of the client 106A of FIG. 4 may transmit a request from the client 106A for a subscription to a first content item, such as the layer 202 of FIG. 2.

The method 1000, at block B1004 includes receiving differences between versions of the first content item based on the subscription. For example, the client 106B or a service 412 of FIG. 4 may provide difference data regarding the first content item to the content management system 104. The differences may reflect a change made to one or more portions of the layer 202. For example, the change may be to a value of the property-value pair 228. The content manager 410 of the client 106A of FIG. 4 may then receive the differences from the content management system 104.

The method 1000, at block B1006 includes resolving a value of a property for a second content item based on the differences and the override. For example, the content manager 410 may resolve a value of the property-value pair 236 based on the differences and the override specified for the corresponding property in the layer 204.

Additional Example

In at least one embodiment, a system includes a processing unit and memory coupled to the processing unit and having stored therein a data store to store data representative of objects of a three dimensional (3D) environment, where an object of the objects comprises a set of properties and values defined across content items of scene description of the 3D environment. The system also includes a communications manager coupled to the memory and operable for establishing bidirectional communication channels with clients for access to one or more of the content items of the 3D environment. Delta information representative of one or more changes to the set of properties and values of the object of a content item of the content items contributed to by a first client of the clients over a first of the bidirectional communication channels is saved to the data store and provided over a second of the bidirectional communication channels to at least a second client of the clients based on a subscription by the second client to the content item. The content item may be a layer of layers of the scene description and the set of properties and values of the object may be resolved by a ranking of the layers.

FIG. 11 is a block diagram of an example computing device 1100 suitable for use in implementing some embodiments of the present disclosure. Computing device 1100 may include a bus 1102 that directly or indirectly couples the following devices: memory 1104, one or more central processing units (CPUs) 1106, one or more graphics processing units (GPUs) 1108, a communication interface 1110, input/output (I/O) ports 1112, input/output components 1114, a power supply 1116, and one or more presentation components 1118 (e.g., display(s)).

Although the various blocks of FIG. 11 are shown as connected via the bus 1102 with lines, this is not intended to be limiting and is for clarity only. For example, in some embodiments, a presentation component 1118, such as a display device, may be considered an I/O component 1114 (e.g., if the display is a touch screen). As another example, the CPUs 1106 and/or GPUs 1108 may include memory (e.g., the memory 1104 may be representative of a storage device in addition to the memory of the GPUs 1108, the CPUs 1106, and/or other components). In other words, the computing device of FIG. 11 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 11.

The bus 1102 may represent one or more busses, such as an address bus, a data bus, a control bus, or a combination thereof. The bus 1102 may include one or more bus types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus.

The memory 1104 may include any of a variety of computer-readable media. The computer-readable media may be any available media that may be accessed by the computing device 1100. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1104 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1100. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1106 may be configured to execute the computer-readable instructions to control one or more components of the computing device 1100 to perform one or more of the methods and/or processes described herein. The CPU(s) 1106 may each include one or more cores (e.g., one, two, four, eight, twenty-eight, seventy-two, etc.) that are capable of handling a multitude of software threads simultaneously. The CPU(s) 1106 may include any type of processor, and may include different types of processors depending on the type of computing device 1100 implemented (e.g., processors with fewer cores for mobile devices and processors with more cores for servers). For example, depending on the type of computing device 1100, the processor may be an Advanced RISC Machines (ARM) processor implemented using Reduced Instruction Set Computing (RISC) or an x86 processor implemented using Complex Instruction Set Computing (CISC). The computing device 1100 may include one or more CPUs 1106 in addition to one or more microprocessors or supplementary co-processors, such as math co-processors.

The GPU(s) 1108 may be used by the computing device 1100 to render graphics (e.g., 3D graphics). The GPU(s) 1108 may include hundreds or thousands of cores that are capable of handling hundreds or thousands of software threads simultaneously. The GPU(s) 1108 may generate pixel data for output images in response to rendering commands (e.g., rendering commands from the CPU(s) 1106 received via a host interface). The GPU(s) 1108 may include graphics memory, such as display memory, for storing pixel data. The display memory may be included as part of the memory 1104. The GPU(s) 1108 may include two or more GPUs operating in parallel (e.g., via a link). When combined together, each GPU 1108 may generate pixel data for different portions of an output image or for different output images (e.g., a first GPU for a first image and a second GPU for a second image). Each GPU may include its own memory, or may share memory with other GPUs.

The communication interface 1110 may include one or more receivers, transmitters, and/or transceivers that enable the computing device 1100 to communicate with other computing devices via an electronic communication network, included wired and/or wireless communications. The communication interface 1110 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet), low-power wide-area networks (e.g., LoRaWAN, SigFox, etc.), and/or the Internet.

The I/O ports 1112 may enable the computing device 1100 to be logically coupled to other devices including the I/O components 1114, the presentation component(s) 1118, and/or other components, some of which may be built in to (e.g., integrated in) the computing device 1100. Illustrative I/O components 1114 include a microphone, mouse, keyboard, joystick, game pad, game controller, satellite dish, scanner, printer, wireless device, etc. The I/O components 1114 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1100. The computing device 1100 may be include depth cameras, such as stereoscopic camera systems, infrared camera systems, RGB camera systems, touchscreen technology, and combinations of these, for gesture detection and recognition. Additionally, the computing device 1100 may include accelerometers or gyroscopes (e.g., as part of an inertia measurement unit (IMU)) that enable detection of motion. In some examples, the output of the accelerometers or gyroscopes may be used by the computing device 1100 to render immersive augmented reality or virtual reality.

The power supply 1116 may include a hard-wired power supply, a battery power supply, or a combination thereof. The power supply 1116 may provide power to the computing device 1100 to enable the components of the computing device 1100 to operate.

The presentation component(s) 1118 may include a display (e.g., a monitor, a touch screen, a television screen, a heads-up-display (HUD), other display types, or a combination thereof), speakers, and/or other presentation components. The presentation component(s) 1118 may receive data from other components (e.g., the GPU(s) 1108, the CPU(s) 1106, etc.), and output the data (e.g., as an image, video, sound, etc.).

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The invention claimed is:

1. A method comprising:
receiving, from a first client, first data representative of a request for a subscription to a first content item of content items in a description of a three-dimensional (3D) graphics virtual environment, the description and a register of a set of the content items in the description that the first client is subscribed to being maintained in one or more data stores;
receiving, from a second client, second data representative of differences between versions of the first content item, the differences capturing a change to a property of the first content item made using the second client; and
transmitting, to the first client, third data representative of the differences based on identifying the subscription to the first content item in the register, wherein the transmitting causes the first client to resolve a value of the property for a second content item based on the differences and based on the second content item being defined as inheriting the property from the first content item with an override to the property.

2. The method of claim 1, wherein the 3D graphics virtual environment is represented by the description using a scene description language.

3. The method of claim 1, wherein the 3D graphics virtual environment is represented by the description as a scene graph.

4. The method of claim 1, wherein the first content item is a first layer of layers that define property-value pairs of the 3D graphics virtual environment and the second content item is a second layer of the layers, and the override is defined based on a ranking of the layers.

5. The method of claim 1, wherein the override is specified by the value being included in the second content item.

6. The method of claim 1, wherein the second content item of the content items inherits the property from the first content item based on a reference to the first content item in the second content item.

7. The method of claim 1, wherein the change is made by the second client to a version of the versions of the first content item, wherein the version is local to the second client and the second client displays a rendering of the 3D graphics virtual environment using the version.

8. The method of claim 1, wherein the request for the subscription to the first content item includes a Uniform Resource Identifier (URI) of the first content item.

9. The method of claim 1, wherein the second client resolves the property to a different value than the first client based at least on the second client being subscribed to a different set of the content items than the first client, the different set including the first content item without defining the override.

10. A method comprising:
receiving, from a first client, first data representative of a request for a subscription to a first asset of assets in a description of a three-dimensional (3D) graphics virtual environment, the description and a register of a set of the assets in the description that the first client is subscribed to being maintained in one or more data stores, wherein a second asset of the assets is defined by the description as inheriting a property from the first asset and having an override to the property;

receiving, from a second client, second data representative of differences between versions of the first asset, the differences capturing a change to the property made using the second client; and transmitting, to the first client, third data representative of the differences based on identifying the subscription to the first asset in the register, wherein the transmitting causes the first client to resolve a value of the property for the second asset based on the differences and the override.

11. The method of claim 10, wherein the first asset is a first layer of layers that define property-value pairs the 3D graphics virtual environment, the second asset is a second layer of the layers, and the override is based on the second layer being higher than the first layer in a hierarchy of the layers.

12. The method of claim 10, wherein the subscription is managed by at least one server using a publish/subscribe model.

13. The method of claim 10, wherein the override is specified in the second asset.

14. The method of claim 10, wherein the first asset comprises a class and the second asset inherits the property from the first asset based on the second asset being an instantiation of the class.

15. The method of claim 10, wherein the property is a first property of a plurality of properties inherited by the first asset from the first asset and the transmitting causes the first client to resolve a second property of the plurality of properties to a value for the second property that is specified in the first asset.

16. The method of claim 10, wherein the change corresponds to an edit made in a user interface displaying, on the second client, a graphical representation of at least the first asset in the 3D graphics virtual environment, the graphical representation being defined by values of properties of the first asset.

17. A method comprising:

transmitting, to a server system, first data representative of a request from a first client for a subscription to a first content item of content items in a description of a three-dimensional (3D) graphics virtual environment, the description and a register of a set of the content items in the description the first client is subscribed to being stored in one or more data stores;

receiving, from the server system and based on the server system identifying the subscription in the register of the set of the content items, second data representative of differences between versions of the first content item, the differences being based on a change to a property of the first content item made using a second client; and resolving, by the first client, a value of the property for the second content item based on the differences received in the second data and based on the second content item being defined as inheriting the property from the first content item with an override to the property.

18. The method of claim 17, further comprising updating, by the first client, a display of a graphical representation of the second content item in the 3D graphics virtual environment to reflect the differences between the versions of the first content item, the graphical representation being defined by at least one value inherited from at least one property of the first content item and by the value of the property.

19. The method of claim 17, further comprising updating to reflect the differences and by the first client, each of a first representation of a plurality of the content items that is native to the first client and a second representation of the plurality of the content items that is used by the server system.

20. The method of claim 17, wherein the resolving is based on applying one or more schemas to a local representation of the first content item and the second content item.

* * * * *